US012712244B2

(12) United States Patent
Li et al.

(10) Patent No.: US 12,712,244 B2
(45) Date of Patent: Aug. 18, 2026

(54) BATTERY CELL AND METHOD AND EQUIPMENT FOR MANUFACTURING SAME, BATTERY, AND ELECTRICAL DEVICE

(71) Applicant: CONTEMPORARY AMPEREX TECHNOLOGY (HONG KONG) LIMITED, Hong Kong (CN)

(72) Inventors: Ying Li, Ningde (CN); Chao Liu, Ningde (CN); Qingkui Chi, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 538 days.

(21) Appl. No.: 18/221,880

(22) Filed: Jul. 14, 2023

(65) Prior Publication Data

US 2023/0361439 A1 Nov. 9, 2023

Related U.S. Application Data

(63) Continuation of application No. PCT/CN2021/125106, filed on Oct. 20, 2021.

(51) Int. Cl.
*H01M 50/636* (2021.01)
*H01M 10/0585* (2010.01)
(Continued)

(52) U.S. Cl.
CPC ..... *H01M 50/636* (2021.01); *H01M 10/0585* (2013.01); *H01M 50/54* (2021.01);
(Continued)

(58) Field of Classification Search
None
See application file for complete search history.

(56) References Cited

U.S. PATENT DOCUMENTS

2002/0004162 A1* 1/2002 Satoh .................. H01M 50/534 429/211
2005/0260487 A1 11/2005 Kim et al.
(Continued)

FOREIGN PATENT DOCUMENTS

CN 102347515 A 2/2012
CN 103066233 A 4/2013
(Continued)

OTHER PUBLICATIONS

International Search Report and Written Opinion mailed on Jul. 25, 2022, received for PCT Application PCT/CN2021/125106, filed on Oct. 20, 2021, 8 pages including English Translation.
(Continued)

*Primary Examiner* — Carlos Barcena
(74) *Attorney, Agent, or Firm* — XSENSUS LLP

(57) ABSTRACT

This application discloses a battery cell and a method and equipment for manufacturing same, a battery, and an electrical device, and relates to the technical field of battery manufacturing. This application discloses a battery cell, which may include: a shell, including a first wall; an electrode terminal, dielectrically mounted on the first wall; an electrode assembly, accommodated in the shell, where the electrode assembly may include a center hole, and a first tab may be disposed on the electrode assembly; and a current collection component, disposed between the first wall and the electrode assembly. The current collection component may include a center portion and a periphery portion. The center portion may positionally correspond to the center hole.

19 Claims, 11 Drawing Sheets

(51) Int. Cl.
*H01M 50/54* (2021.01)
*H01M 50/559* (2021.01)
*H01M 50/593* (2021.01)

(52) U.S. Cl.
CPC ....... *H01M 50/559* (2021.01); *H01M 50/593* (2021.01); *H01M 2220/20* (2013.01)

(56) References Cited

U.S. PATENT DOCUMENTS

2005/0277020 A1 12/2005 Cheon et al.
2008/0026291 A1* 1/2008 Kim .................... H01M 50/152 429/211
2009/0047576 A1* 2/2009 Okabe ................... H01M 10/30 429/218.2
2013/0029191 A1 1/2013 Byun et al.
2016/0343997 A1* 11/2016 Sekiya ................... H01G 11/06
2017/0373339 A1* 12/2017 Cho .................... H01M 10/052
2023/0231246 A1* 7/2023 Jung ....................... H01M 4/70 429/185
2024/0380078 A1* 11/2024 Kobayashi .......... H01M 50/152

FOREIGN PATENT DOCUMENTS

CN 103730624 A 4/2014
CN 204885267 U 12/2015
CN 208284552 U 12/2018
CN 212033143 U 11/2020
CN 112821019 A 5/2021

OTHER PUBLICATIONS

Partial European Search Report issued Sep. 29, 2025 in European Patent Application No. 25182739.0.
Notification of the First Office Action issued Aug. 15, 2025 in Chinese Patent Application No. 202180093551.5 with English translation thereof.
Partial Supplementary European Search Report issued Mar. 22, 20024 in European Patent Application No. 21960938.5.

* cited by examiner 1111 1431 141 P 1212 13 1431 142
14
12
1211
R 1111
1421
1431
141
146
P
1212
13
14
1421
142
12
R

BATTERY CELL AND METHOD AND EQUIPMENT FOR MANUFACTURING SAME, BATTERY, AND ELECTRICAL DEVICE

CROSS-REFERENCE TO RELATED APPLICATION

The present application is a continuation of International Application No. PCT/CN2021/125106, filed Oct. 20, 2021, which is incorporated herein by reference in its entirety.

TECHNICAL FIELD

This application relates to the technical field of battery manufacturing, and in particular, to a battery cell and a method and equipment for manufacturing same, a battery, and an electrical device.

BACKGROUND

With the new energy vehicle market booming continuously, the power battery industry is growing and expanding rapidly. With the lithium battery technology becoming more sophisticated and advanced, higher requirements have been put forward on safety performance, energy density, and ease of industrialization of battery cells.

During assembling of a battery cell, an electrolytic solution needs to be injected into the battery cell to infiltrate an electrode assembly. However, currently, the electrolyte injection efficiency of the battery cell is low, and the infiltration effect of the electrode assembly is inferior, resulting in a low capacitance and low safety performance of the battery cell.

SUMMARY

In view of the situation above, this application discloses a battery cell and a method and equipment for manufacturing same, a battery, and an electrical device, in which an electrolytic solution can infiltrate an electrode assembly more quickly and sufficiently, thereby not only improving the electrolyte injection efficiency of the battery cell, but also improving the capacitance and safety performance of the battery cell.

A first aspect of this application discloses a battery cell, including: a shell, including a first wall; an electrode terminal, dielectrically mounted on the first wall; an electrode assembly, accommodated in the shell, where the electrode assembly includes a center hole, and a first tab is formed on the electrode assembly at an end oriented toward the first wall; and a current collection component, disposed between the first wall and the electrode assembly. The current collection component includes a center portion and a periphery portion. The center portion positionally corresponds to the center hole. The center portion is configured to be connected to the electrode terminal. The periphery portion is configured to be connected to the first tab. A guide channel is disposed on the current collection component. The guide channel is configured to guide an electrolytic solution in the center hole to diffuse from the center portion to the periphery portion.

During injection of the electrolytic solution into the battery cell, the electrolytic solution enters the center hole. The guide channel guides the electrolytic solution in the center hole to diffuse from the center portion to the periphery portion, so as to quickly and sufficiently infiltrate the electrode assembly, thereby not only improving the electrolyte injection efficiency of the battery cell, but also improving the capacitance and safety performance of the battery cell.

According to some embodiments of this application, the guide channel is a first through-hole, and the first through-hole is located at an edge of the center portion.

In the above technical solution, the first through-hole is located at the edge of the center portion. Through the first through-hole, the electrolytic solution flows from one side to another side of the current collection component, the one side being close to the electrode assembly, and the other side being close to the first wall. In this way, the electrolytic solution is diffused to the periphery portion to infiltrate the electrode assembly quickly and sufficiently.

According to some embodiments of this application, the center portion protrudes beyond the periphery portion toward the electrode terminal. The current collection component further includes a transition portion. The transition portion encloses the center portion. The transition portion connects the center portion and the periphery portion. The first through-hole is disposed in the transition portion.

In the above technical solution, the center portion protrudes beyond the periphery portion toward the electrode terminal, and combines with the transition portion to form an electrolyte storage space that communicates with the center hole. The first through-hole is made in the transition portion. Therefore, after entering the electrolyte storage space from the center hole, the electrolytic solution flows along a perforation direction of the first through-hole to a side of the current collection component, the side being close to the first wall. The electrolytic solution continues to diffuse to the periphery portion along the perforation direction of the first through-hole, thereby infiltrating the electrode assembly quickly and sufficiently.

According to some embodiments of this application, the first through-hole is plural in number. The plurality of first through-holes are disposed around the center portion at intervals.

In the above technical solution, the plurality of first through-holes are arranged around the center portion at intervals, thereby guiding the electrolytic solution to diffuse to the periphery portion around the center portion circumferentially, and making the electrolytic solution infiltrate the electrode assembly quickly and sufficiently.

According to some embodiments of this application, along a circumference of the center portion, a total length of the plurality of first through-holes is greater than or equal to ½ of a perimeter of the transition portion.

In the above solution, the flow area of the transition portion is smaller than the flow area of the center portion and the periphery portion that are connected to the transition portion. Therefore, when an internal current of the battery cell is excessive, the current collection component is fused off in time, thereby electrically disconnecting the electrode terminal from the first tab in time, and achieving relatively high safety performance of the battery cell.

According to some embodiments of this application, the first through-hole is an arc-shaped hole that extends along a circumference of the center portion.

In the above technical solution, the first through-hole is an arc-shaped hole that extends along the circumference of the center portion, thereby not only increasing the opening area of the first through-hole and facilitating diffusion of the electrolytic solution, but also reducing a protruding height by which the center portion protrudes beyond the periphery portion, thinning the current collection component, making the battery cell structurally compact, and achieving a relatively high energy density.

According to some embodiments of this application, a second through-hole is made on the periphery portion. The second through-hole is farther away from the center portion than the first through-hole.

In the above technical solution, the second through-hole is made in the periphery portion, and can partly expose a clearance between two adjacent layers of electrode plate of the electrode assembly. Through the second through-hole, the electrolytic solution can enter the clearance between the two adjacent layers of electrode plate of the electrode assembly to infiltrate the electrode assembly quickly and sufficiently.

According to some embodiments of this application, the second through-hole is plural in number. The plurality of second through-holes are disposed around the center portion at intervals.

In the above technical solution, the plurality of second through-holes are arranged around the center portion at intervals, thereby guiding the electrolytic solution to flow around the center portion circumferentially into the clearance between the two adjacent layers of electrode plate of the electrode assembly to infiltrate the electrode assembly quickly and sufficiently.

According to some embodiments of this application, a first groove is made on a side of the periphery portion, the side being away from the electrode assembly. The first groove is configured to communicate with the first through-hole and the second through-hole.

In the above technical solution, the first groove is made on a side of the periphery portion, the side being away from the electrode assembly. In addition, the first groove communicates with the first through-hole and the second through-hole, and can guide the electrolytic solution to flow from the first through-hole to the second through-hole to enter the electrode assembly, thereby increasing a space of the current collection component at a side away from the electrode assembly, and increasing the diffusion speed of the electrolytic solution.

According to some embodiments of this application, the first groove extends to an outer peripheral surface of the periphery portion along a radial direction of the electrode assembly.

In the above technical solution, the first groove extends to the outer peripheral surface of the periphery portion, and can guide excess electrolytic solution to flow into the clearance between the electrode assembly and the shell. In this way, the electrolytic solution fills in the shell quickly to infiltrate the electrode assembly sufficiently.

According to some embodiments of this application, the battery cell further includes: an insulator, disposed between the current collection component and the first wall, and configured to dielectrically insulate the current collection component from the first wall; a second groove is made on a side of the insulator, the side being oriented toward the current collection component; and the second groove is configured to communicate with the first through-hole and the second through-hole.

In the above technical solution, the electrolytic solution flowing out of the first through-hole enters the clearance between the insulator and the current collection component. The second groove can guide the electrolytic solution to flow from the first through-hole to the second through-hole to enter the electrode assembly, and can increase the space of the current collection component at a side away from the electrode assembly, thereby increasing the diffusion speed of the electrolytic solution.

According to some embodiments of this application, the second groove extends to an outer peripheral surface of the insulator along a radial direction of the electrode assembly.

In the above technical solution, the second groove extends to the outer peripheral surface of the insulator, and can guide excess electrolytic solution to flow into the clearance between the electrode assembly and the shell. In this way, the electrolytic solution fills in the shell quickly to infiltrate the electrode assembly sufficiently.

According to some embodiments of this application, the guide channel is a third groove. The third groove is made on a side of the periphery portion, the side being oriented toward the electrode assembly. The third groove communicates with the center hole.

In the above technical solution, the electrolytic solution in the center hole enters the clearance between the electrode assembly and the current collection component. The third groove can guide the electrolytic solution to diffuse to the peripheral portion, thereby increasing the diffusion speed of the electrolytic solution.

According to some embodiments of this application, the third groove extends to an outer peripheral surface of the periphery portion along a radial direction of the electrode assembly.

In the above technical solution, the third groove extends to the outer peripheral surface of the periphery portion, and can guide excess electrolytic solution to flow into the clearance between the electrode assembly and the shell. In this way, the electrolytic solution fills in the shell quickly to infiltrate the electrode assembly sufficiently.

According to some embodiments of this application, the shell further includes a second wall. The second wall is disposed opposite to the first wall along an axial direction of the center hole. An injection port is made on the second wall at a position corresponding to the center hole. The battery cell further includes: a sealing element, configured to seal up the injection port.

In the above technical solution, the injection port and the guide channel are arranged on two sides of the center hole in an axial direction of the center hole respectively. The electrolytic solution enters the center hole through the injection port. A part of the electrolytic solution enters the electrode assembly from the center hole. Another part of the electrolytic solution enters the guide channel. The guide channel guides the electrolytic solution to further diffuse from the center portion to the periphery portion, so as to infiltrate the electrode assembly quickly and sufficiently.

According to some embodiments of this application, a second tab is formed on the electrode assembly at an end oriented toward the second wall. The first tab and the second tab are of opposite polarities, and the second tab is electrically connected to the second wall.

In the above technical solution, the first tab of the battery cell is electrically connected to the electrode terminal. The second tab is electrically connected to the second wall. The battery cell is electrically connected to the outside through the electrode terminal and the shell, thereby simplifying the structure of the battery cell.

According to some embodiments of this application, the shell includes a housing and an end cap. The housing includes a bottom wall and a sidewall. The sidewall encloses the bottom wall. One end of the sidewall is connected to the bottom wall, and another end of the sidewall forms an opening. The end cap covers the opening. The first wall is the bottom wall, and the second wall is the end cap.

In the above technical solution, the injection port is made on the end cap. The electrode terminal is disposed on the bottom wall, and the current collection component is disposed between the bottom wall and the electrode assembly, thereby making it practicable to weld the electrode terminal to the current collection component first and then cover the opening with the end cap, and in turn, simplifying the assembling process of the battery cell.

A second aspect of this application discloses a battery, including the battery cell according to an embodiment in the second aspect of this application.

A third aspect of this application discloses an electrical device, including the battery according to an embodiment in the third aspect of this application.

An embodiment in a fourth aspect of this application discloses a method for manufacturing a battery cell, including:

- providing a housing and an electrode terminal, where the housing includes a bottom wall and a sidewall, the sidewall encloses the bottom wall, one end of the sidewall is connected to the bottom wall, the other end of the sidewall forms an opening, and the electrode terminal is dielectrically mounted on the bottom wall;
- providing an electrode assembly, where the electrode assembly includes a center hole, a first tab is formed at one end of the electrode assembly, and a second tab is formed at another end of the electrode assembly;
- providing a current collection component, where the current collection component includes a center portion and a periphery portion, and a guide channel is disposed on the current collection component;
- providing an end cap, where an injection port is made on the end cap;
- connecting the periphery portion to the first tab, making the center portion positionally correspond to the center hole, putting the electrode assembly into the housing, positioning the current collection component between the bottom wall and the electrode assembly, and connecting the center portion to the electrode terminal;
- covering the opening with the end cap, and connecting the end cap to the second tab so that the injection port positionally corresponds to the center hole; and
- injecting an electrolytic solution into the housing through the injection port so that the electrolytic solution enters the center hole and diffuses from the center portion to the periphery portion through the guide channel.

An embodiment in a fifth aspect of this application discloses a piece of equipment for manufacturing a battery cell, including:

- a first providing apparatus, configured to provide a housing and an electrode terminal, where the housing includes a bottom wall and a sidewall, the sidewall encloses the bottom wall, one end of the sidewall is connected to the bottom wall, the other end of the sidewall forms an opening, and the electrode terminal is dielectrically mounted on the bottom wall;
- a second providing apparatus, configured to provide an electrode assembly, where the electrode assembly includes a center hole, a first tab is formed at one end of the electrode assembly, and a second tab is formed at another end of the electrode assembly;
- a third providing apparatus, configured to provide a current collection component, where the current collection component includes a center portion and a periphery portion, and a guide channel is disposed on the current collection component;
- a fourth providing apparatus, configured to provide an end cap, where an injection port is made on the end cap;
- a first assembling module, configured to connect the periphery portion to the first tab, make the center portion positionally correspond to the center hole, putting the electrode assembly into the housing, position the current collection component between the bottom wall and the electrode assembly, and connect the center portion to the electrode terminal; cover the opening with the end cap, and connect the end cap to the second tab so that the injection port positionally corresponds to the center hole; and
- a second assembling module, configured to inject an electrolytic solution into the housing through the injection port so that the electrolytic solution enters the center hole and diffuses from the center portion to the periphery portion through the guide channel.

Additional aspects and advantages of this application will be partly given in the following description, and a part thereof will become evident in the following description or will be learned in the practice of this application.

BRIEF DESCRIPTION OF DRAWINGS

To describe technical solutions in embodiments of this application more clearly, the following outlines the drawings to be used in the embodiments. Understandably, the following drawings show merely some embodiments of this application, and therefore, are not intended to limit the scope. A person of ordinary skill in the art may derive other related drawings from the drawings without making any creative efforts.

Figure 1:
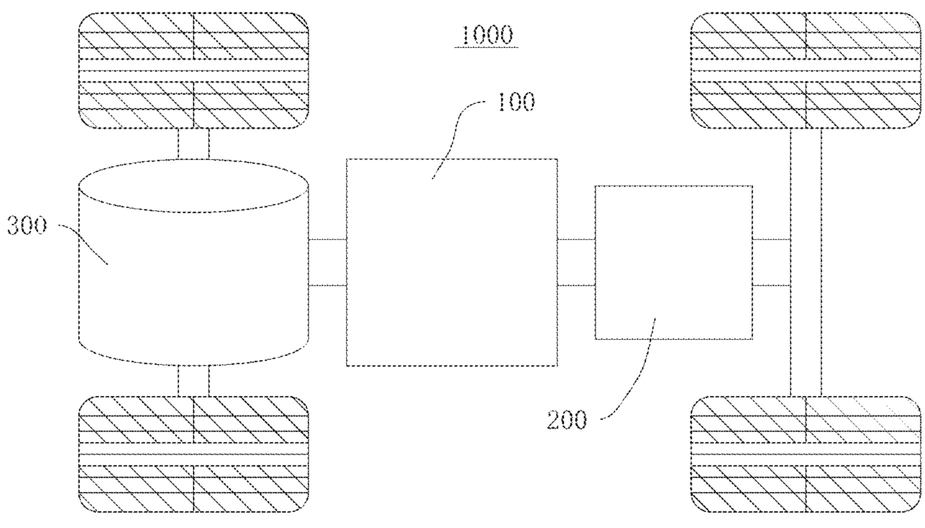
FIG. 1 is a brief schematic diagram of a vehicle according to an embodiment of this application.

The drawings are not drawn to scale.

List of reference numerals: 1000—vehicle; 100—battery; 10—battery cell; 11—shell; 111—housing; 1111—bottom wall; 1112—sidewall; 112—end cap; 1121—injection port; 113—opening; 12—electrode assembly; 121—main body; 1211—center hole; 1212—first end; 1213—second end; 122—first tab; 123—second tab; 13—electrode terminal; 14—current collection component; 141—center portion; 142—periphery portion; 1421—second through-hole; 1422—first groove; 1423—third groove; 1424—first outer peripheral surface; 143—transition portion; 1431—first through-hole; 144—first surface; 145—second surface; 146—electrolyte storage space; 15—sealing element; 16—insulator; 161—third surface; 1611—second groove; 162—fourth surface; 163—second outer peripheral surface; 20—box; 21—first box part; 22—second box part; 200—controller; 300—motor; 2000—manufacturing equipment; 2100—first providing apparatus; 2200—second providing apparatus; 2300—third providing apparatus; 2400—fourth providing apparatus; 2500—first assembling module; 2600—second assembling module.

DETAILED DESCRIPTION OF EMBODIMENTS

To make the objectives, technical solutions, and advantages of the embodiments of this application clearer, the following gives a clear description of the technical solutions in some embodiments of this application with reference to the drawings in some embodiments of this application. Evidently, the described embodiments are merely a part rather than all of the embodiments of this application. All other embodiments derived by a person of ordinary skill in the art based on the embodiments of this application without making any creative efforts still fall within the protection scope of this application.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

"A plurality of" referred to in this application means two or more (including two).

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in various shapes such as a cylinder, flat body, or cuboid, without being limited in embodiments of this application. Depending on the form of packaging, battery cells are generally classed into three types: cylindrical battery cell, prismatic battery cell, and pouch-type battery cell.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. A surface of the positive current collector is coated with the positive active material layer. Of the positive current collector, a part uncoated with the positive active material layer protrudes from a part coated with the positive active material layer. The part, uncoated with the positive active material layer, of the positive current collector, serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. Of the negative current collector, a part uncoated with the negative active material layer protrudes from a part coated with the negative active material layer, and the part uncoated with the negative active material layer serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. The separator may be made of a material such as PP (polypropylene, polypropylene) or PE (polyethylene, polyethylene). In addition, the electrode assembly may be of a jelly-roll type structure or a stacked type structure, without being limited herein.

The battery cell further includes a current collection component. The current collection component is configured to electrically connect a tab of the battery cell to an electrode terminal, so that electrical energy is transferred from the electrode assembly to the electrode terminal and then transferred out of the battery cell through the electrode terminal. A plurality of battery cells are electrically connected to each other by a busbar component, so as to implement series, parallel, or series-and-parallel connection between the battery cells.

In the related art, during injection of an electrolytic solution into a battery cell, the electrolytic solution can hardly diffuse after entering the shell. The electrolyte injection time is relatively long, and the injection efficiency is relatively low. Moreover, the electrolytic solution is unable to infiltrate the electrode assembly sufficiently. Consequently, the electrolytic solution is inferior in infiltrating the electrode assembly. The battery cell is prone to lithium plating during charging and discharging, and the capacitance is also be impaired.

The applicant hereof has found through research that an internal structure of a battery cell is usually compact. The close contact between an electrode assembly and a current collection component, between the current collection component and a shell, and between the electrode assembly and the shell can reduce the size of the battery cell and increase the energy density of the battery cell. In an existing battery cell, there is no channel for guiding an electrolytic solution to diffuse rapidly. After entering the shell, the electrolytic solution diffuses through a gap between two closely contacting components. The diffusion of the electrolytic solution is slow and uneven, thereby leading to low electrolyte injection efficiency of the battery cell and a poor effect of infiltrating the electrode assembly.

Based on the above conception, this application discloses a new technical solution, in which the electrolytic solution can infiltrate the electrode assembly more quickly and sufficiently, thereby not only improving the electrolyte injection efficiency of the battery cell, but also improving the capacitance and safety performance of the battery cell.

Understandably, the battery cell described in an embodiment of this application may directly supply power to an electrical device, or a plurality of battery cells may be connected in parallel or in series to form a battery that supplies power to various electrical devices.

Understandably, the electrical devices that employ the battery cell, battery module, or battery according to an embodiment of this application may come in various forms, for example, a mobile phone, a portable device, a notebook computer, an electric power cart, an electric vehicle, a ship, a spacecraft, an electric toy, an electric tool. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, or an electric planer.

The battery cell and the battery described in an embodiment of this application are not only applicable to the electrical devices described above, but also applicable to all electrical devices that use a battery cell or a battery. For brevity, however, the following embodiments are described by using an electric vehicle as an example.

Figure 2:
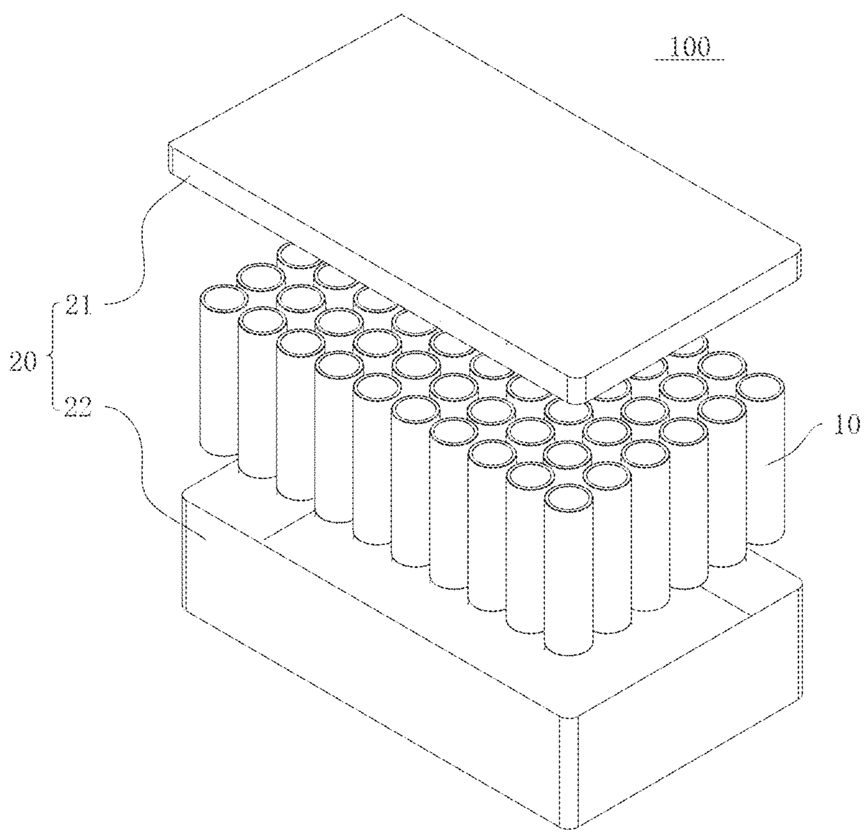
FIG. 2 is a schematic structural diagram of a battery in the vehicle shown in FIG. 1.

FIG. 1 is a brief schematic diagram of a vehicle according to an embodiment of this application, and FIG. 2 is a schematic structural diagram of a battery in the vehicle shown in FIG. 1.

As shown in FIG. 1, a battery 100, a controller 200, and a motor 300 are disposed inside a vehicle 1000. For example, the battery 100 may be disposed at the bottom, front, or rear of the vehicle 1000. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like.

In some embodiments of this application, the battery 100 may be configured to supply power to the vehicle 1000. For example, the battery 100 may serve as an operating power supply of the vehicle 1000. The controller 200 is configured to control the battery 100 to supply power to the motor 300, for example, to meet electrical energy requirements in starting, navigating, or running the vehicle 1000.

In other embodiments, the battery 100 serves not only as an operating power supply of the vehicle 1000, but may also serve as a driving power supply of the vehicle 1000 to provide driving power for the vehicle in place of or partly in place of fuel oil or natural gas.

The battery 100 referred to herein means a unitary physical module that includes one or more battery cells 10 to provide a higher voltage and a higher capacity. A plurality of battery cells 10 may be connected in series, parallel, or series-and-parallel pattern to form a battery 100 directly. The series-and-parallel pattern means a combination of series connection and parallel connection of the plurality of battery cells 10. Alternatively, the plurality of battery cells 10 may be connected in series, parallel, or series-and-parallel pattern to form a battery 100 module first, and then a plurality of battery 100 modules may be connected in series, parallel, or series-and-parallel pattern to forma battery 100.

In FIG. 2, the battery 100 includes a plurality of battery cells 10 and a box 20. The plurality of battery cells 10 are accommodated in the box 20. The box 20 includes a first box part 21 and a second box part 22. The first box part 21 and the second box part 22 fit and cover each other to form a battery 100 cavity. A plurality of battery 100 modules are placed in the battery 100 cavity. The shapes of the first box part 21 and the second box part 22 may depend on the shape of a combination of the plurality of battery 100 modules. The first box part 21 and the second box part 22 each may include one opening. For example, the first box part 21 and the second box part 22 each may be a hollow cuboid, and each may include only one opening surface. The opening of the first box part 21 is opposite to the opening of the second box part 22. The first box part 21 and the second box part 22 are snap-fitted to each other to form a box 20 that includes a closed cavity. The plurality of battery cells 10 are combined by being connected in parallel, series, or series-and-parallel pattern, and then placed into the box 20 that is formed by snap-fitting the first box part 21 and the second box part 22.

Figure 3:
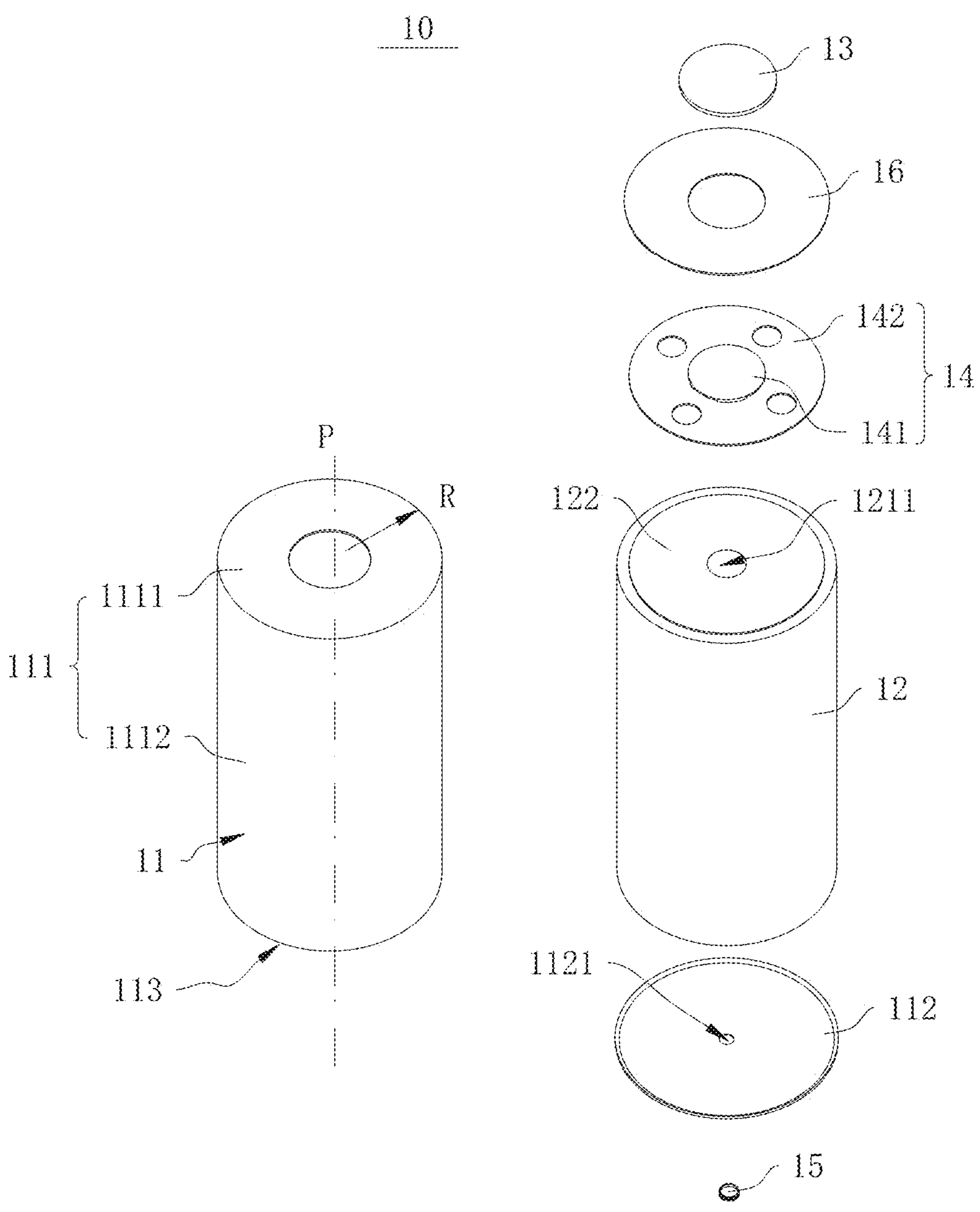
FIG. 3 is an exploded view of a battery cell according to some embodiments of this application.
Figure 4:
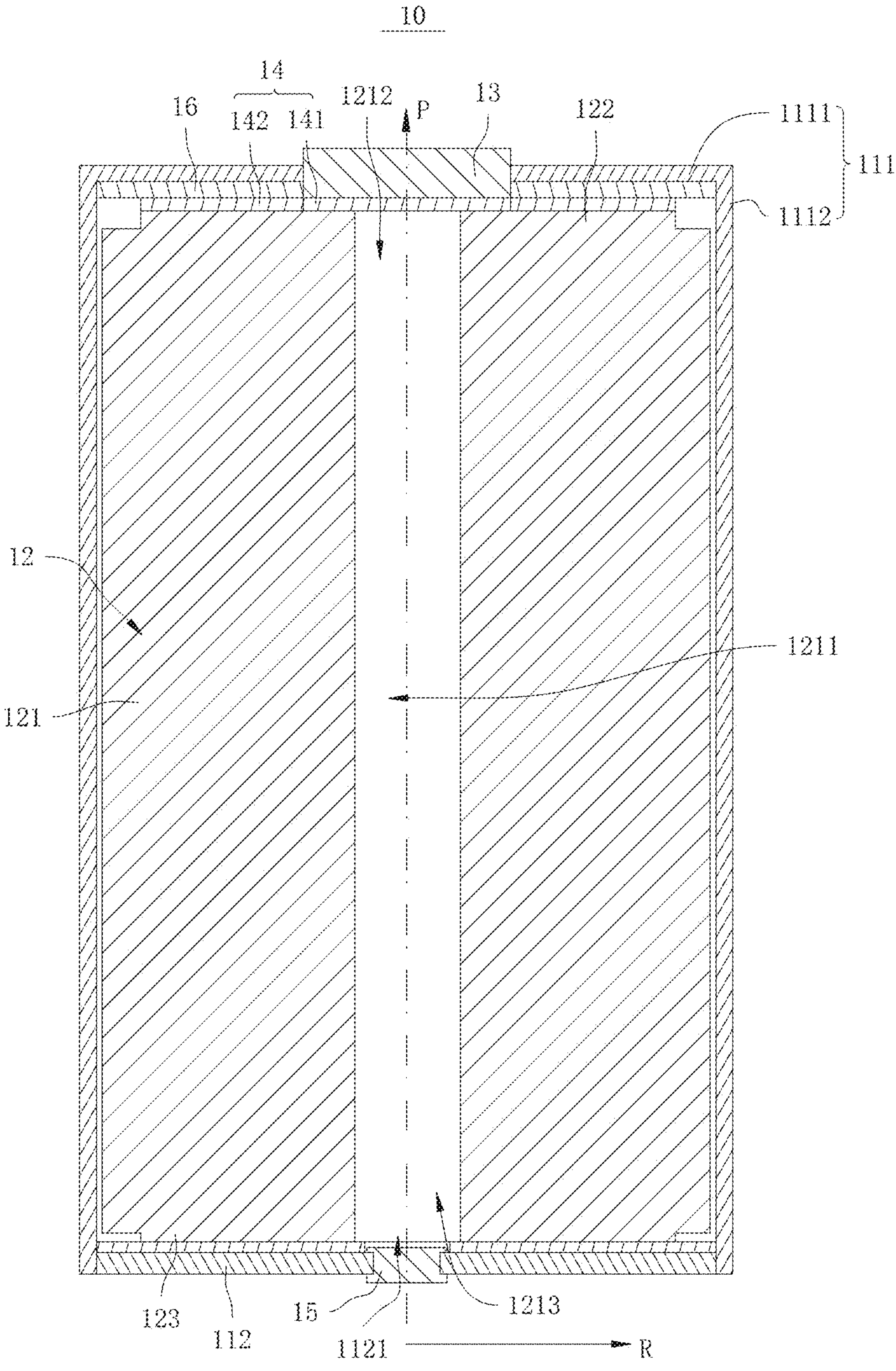
FIG. 4 is a cross-sectional view of the battery cell shown in FIG. 3.

FIG. 3 is an exploded view of a battery cell according to some embodiments of this application, and FIG. 4 is a cross-sectional view of the battery cell shown in FIG. 3.

As shown in FIG. 3 and FIG. 4, the battery cell 10 includes a shell 11, an electrode assembly 12, electrode terminals 13, a current collection component 14, and a sealing element 15.

The shell 11 includes a housing 111 and an end cap 112. The housing 111 includes a bottom wall 1111 and a sidewall 1112. The sidewall 1112 encloses the bottom wall 1111. One end of the sidewall 1112 is connected to the bottom wall 1111, and another end of the sidewall forms an opening 113. The end cap 112 covers the opening 113 to seal the electrode assembly 12 inside the shell 11.

An electrode lead-out hole is made on one of the bottom wall 1111 or the end cap 112. The electrode terminal 13 is dielectrically mounted in the electrode lead-out hole. A plastic piece with a through-hole is disposed in the electrode lead-out hole. The electrode terminal 13 is mounted in the through-hole so as to be dielectrically mounted in the electrode lead-out hole.

The housing 111 may be cylindrical or elliptically cylindrical, or hexahedral. The housing 111 may be made of a metal material, such as aluminum, an aluminum alloy, or nickel-clad steel. The end cap 112 is of a plate-shaped structure. The size and shape of the end cap 112 match the opening 113 of the housing 111. The end cap 112 is fixed to the opening 113 of the housing 111, so as to seal the electrode assembly 12 and the electrolytic solution in an accommodation cavity of the housing 111. The end cap 112 is made of a metal material such as aluminum or steel.

In some embodiments of this application, the housing 111 is a cylinder. The axial direction of the housing 111 extends along a first axis P. The radial direction of the housing extends along the first direction R. The first axis P is perpendicular to the first direction R. The end cap 112 is of a circular plate structure. In other embodiments, the housing 111 may be a hexahedron instead, and the end cap 112 may be of a square or rectangular plate structure.

The electrode assembly 12 is disposed in the shell 11, and the electrode assembly 12 includes a main body 121, a first tab 122, and a second tab 123. The main body 121 includes a positive electrode plate, a negative electrode plate, and a separator. The separator is located between the positive electrode plate and the negative electrode plate, and is configured to separate the positive electrode plate from the negative electrode plate. The first tab 122 and the second tab 123 are of opposite polarities. The first tab 122 is connected to the electrode terminal 13 by the current collection component 14. The second tab 123 is electrically connected to the shell 11. Among the first tab 122 and the second tab 123, the first tab 122 is a positive tab, and the second tab 123 is a negative tab. The second tab 123 may contact the shell 11 directly, or connected to the shell 11 by another current collection component. The current collection component 14 corresponding to the first tab 122 is made of an aluminum material. Based on the implementation of "the second tab 123 is connected to the shell 11 by another current collection component", the current collection component corresponding to the second tab 123 is made of a copper material.

The current collection component 14 is configured to connect the first tab 122 and the electrode terminal 13. The current collection component 14 includes a center portion 141 and a periphery portion 142. The center portion 141 positionally corresponds to the center hole 1211. The center portion 141 is configured to be connected to the electrode terminal 13. The periphery portion 142 is configured to be connected to the first tab 122.

The thickness direction of the current collection component 14 extends along the first axis P. The size and shape of the current collection component 14 may match the housing 111, or may mismatch the size and shape of the housing 111.

In some embodiments of this application, the housing 111 is cylindrical, and the current collection component 14 is of a circular plate-shaped structure with the first axis P used as an axis. In other embodiments, the housing 111 may be hexahedral instead, and the current collection component 14 is of a quadrilateral plate-shaped structure with a thickness direction extending along the first axis P.

As shown in FIG. 3 and FIG. 4, an injection port 1121 is made on the shell 11. The injection port 1121 is configured to pour an electrolytic solution into the shell 11. The sealing element 15 is configured to seal the injection port 1121 after completion of the injection. The injection port 1121 may be sealed up by a pop rivet process. After completion of the pop rivet process, a sealing element 15 is formed. Alternatively, the sealing element 15 may be an elastomer made of a material such as rubber and silicone. The elastomer is embedded into the injection port 1121 to seal up the injection port 1121.

As shown in FIG. 3 and FIG. 4, some embodiments of this application disclose a battery cell 10, including a shell 11, an electrode assembly 12, and a current collection component 14. The shell 11 includes a first wall. An electrode terminal 13 is dielectrically mounted on the first wall. The electrode assembly 12 is disposed in the shell 11. The electrode assembly 12 includes a center hole 1211. A first tab 122 is formed at an end of the electrode assembly 12, the end being oriented toward the first wall. The current collection component 14 is disposed between the first wall and the electrode assembly 12. The current collection component 14 includes a center portion 141 and a periphery portion 142. The center portion 141 positionally corresponds to the center hole 1211. The center portion 141 is configured to be connected to the electrode terminal 13. The periphery portion 142 is configured to be connected to the first tab 122. A guide channel is disposed on the current collection component 14. The guide channel is configured to guide an electrolytic solution in the center hole 1211 to diffuse from the center portion 141 to the periphery portion 142.

The electrode assembly 12 is formed by winding. The center hole 1211 is a winding center of the electrode assembly 12. The center hole 1211 runs through the main body 121 along the first axis P. Of the center hole 1211, an end close to the first wall is a first end 1212, and an end away from the first wall is a second end 1213, as viewed along an extension direction of the first axis P.

The first wall is arranged on the same side as the first tab of the electrode assembly. The first wall is a part of the wall of the shell. In some embodiments of this application, the first wall is a bottom wall 1111, and the electrode terminal 13 is dielectrically disposed on the bottom wall 1111. In other embodiments, the first wall may be an end cap 112 instead, and the electrode terminal 13 is dielectrically disposed on the end cap 112.

The injection port 1121 may be made on the first wall, or on another wall of the shell. In some embodiments of this application, along the extension direction of the first axis P, the injection port 1121 and the electrode terminal 13 are disposed on different sides respectively. The injection port 1121 positionally corresponds to the second end 1213 of the center hole 1211. The electrolytic solution flows from the second end 1213 of the center hole 1211 to the first end 1212, and then diffuses to the periphery portion 142 of the current collection component 14 through the guide channel. In other embodiments, the injection port 1121 and the electrode terminal 13 may be disposed on the same side. The injection port 1121 positionally corresponds to the first end 1212 of the center hole 1211. The electrolytic solution flows into the center hole 1211 from the first end 1212 of the center hole 1211, and then diffuses to the periphery portion 142 of the current collection component 14 through the guide channel.

The current collection component 14 may be implemented in various forms. The center portion 141 may be of a circular plate structure or a rectangular plate structure. The periphery portion 142 may be of a closed annular structure disposed around the center portion 141 circumferentially, or an unclosed annular structure disposed around the center portion 141 circumferentially. The edge of the center portion 141 may be directly connected to the periphery portion 142. The center portion 141 may be flush with the surface of the periphery portion 142; or, the center portion 141 may protrude beyond the periphery portion 142 toward the electrode terminal 13. The central axis of the center portion 141 may coincide with the central axis of the periphery portion 142. For example, the center portion 141 is of a disc structure, and the periphery portion 142 is of a ring structure arranged around the central axis of the disc structure circumferentially. Alternatively, the central axis of the center portion 141 does not coincide with the central axis of the periphery portion 142, so as to implement reliable connection to the electrode terminal.

The center portion 141 positionally corresponds to the center hole 1211, so that the electrolytic solution in the center hole 1211 enters the guide channel from the first end 1212, and diffuses from the center portion 141 to the periphery portion 142. The center portion 141 and the center hole 1211 may be arranged coaxially or non-coaxially. In some embodiments of this application, the central axis of the center portion 141 coincides with the axis of the center hole 1211, so that the central axis of the center portion 141 is also known as the first axis P. In other embodiments, the central axis of the center portion 141 may be parallel to or inclined against the first axis P instead.

The guide channel is configured to guide the electrolytic solution to diffuse from the center hole 1211 to the periphery portion 142. The guide channel may be implemented in various forms. The guide channel may be a through-hole made at the edge of the center portion 141. The electrolytic solution flows from the first through-hole 1431 to a side of the current collection component 14 and diffuses to the periphery portion 142, the side of the current collection component being away from the electrode assembly 12. Alternatively, the guide channel may be a groove made on a side of the periphery portion 142, the side being oriented toward the electrode assembly 12. The electrolytic solution enters a clearance between the current collection component 14 and the electrode assembly 12 through the groove, and diffuses toward the periphery portion 142.

One end of the guide channel communicates with the center hole 1211, and another end of the guide channel may extend to the periphery portion 142, or extend to the edge of the current collection component 14. Further, the other end of the guide channel may extend to the edge of the current collection component 14 along the first direction R, or may helically coil around the first axis P to the edge of the current collection component 14.

One guide channel may be provided alone. All the electrolytic solution in the center hole 1211 is diffused from the center portion 141 to the periphery portion 142 through one guide channel. Alternatively, a plurality of guide channels may be provided, and the plurality of guide channels are distributed at intervals around the first axis P circumferentially. The electrolytic solution in the center hole 1211 enters the plurality of guide channels. The plurality of guide channels jointly guide the electrolytic solution to diffuse from the center portion 141 to the periphery portion 142.

During injection of the electrolytic solution into the battery cell 10, the electrolytic solution enters the center hole 1211. The guide channel guides the electrolytic solution in the center hole 1211 to diffuse from the center portion 141 to the periphery portion 142, so as to quickly and sufficiently infiltrate the electrode assembly 12, thereby not only improving the electrolyte injection efficiency and assembling efficiency of the battery cell 10, but also improving the capacitance and stability of the battery cell 10.

As shown in FIG. 3 and FIG. 4, in some embodiments of this application, the shell 11 further includes a second wall. The second wall is disposed opposite to the first wall along an axial direction of the center hole 1211. An injection port 1121 is made on the second wall at a position corresponding to the center hole 1211. The battery cell 10 further includes: a sealing element 15, configured to seal up the injection port 1121.

The axial direction of the center hole 1211 extends along the first axis P. The second wall and the first wall are arranged on two sides of the center hole 1211 respectively along the first axis P. The second wall is located at a second end 1213 of the center hole 1211, so that the injection port 1121 and the guide channel of the current collection component 14 are arranged on different sides respectively. Based on the implementation of "the first wall is a bottom wall 1111", the second wall is an end cap 112, and the injection port 1121 is made on the end cap 112. Based on the implementation of "the first wall is an end cap 112", the second wall is a bottom wall 1111, and the injection port 1121 is made on the bottom wall 1111.

In the above form of structure, the injection port 1121 and the guide channel are arranged on two sides of the center hole 1211 in an axial direction of the center hole respectively. The electrolytic solution enters the center hole 1211 through the injection port 1121. A part of the electrolytic solution enters the electrode assembly 12 from the center hole 1211. Another part of the electrolytic solution enters the guide channel. The guide channel guides the electrolytic solution to further diffuse from the center portion 141 to the periphery portion 142, so as to infiltrate the electrode assembly 12 quickly and sufficiently.

As shown in FIG. 3 and FIG. 4, in some embodiments of this application, a second tab 123 is formed on the electrode assembly 12 at an end oriented toward the second wall. The first tab 122 and the second tab 123 are of opposite polarities, and the second tab 123 is electrically connected to the second wall.

Based on the above implementation of "the first wall is a bottom wall 1111, and the second wall is an end cap 112", the second tab 123 is connected to the end cap 112 by another current collection component 14. The current collection component 14 equipped with a guide channel is disposed between the bottom wall 1111 and the electrode assembly 12. The center portion 141 of the current collection component 14 is connected to the electrode terminal 13. The periphery portion 142 is connected to the first tab 122.

Based on the above implementation of "the first wall is an end cap 112, and the second wall is a bottom wall 1111", the second tab 123 is connected to the bottom wall 1111 by another current collection component 14. The current collection component 14 equipped with a guide channel is disposed between the end cap 112 and the electrode assembly 12. The center portion 141 of the current collection component 14 is connected to the electrode terminal 13. The periphery portion 142 is connected to the first tab 122.

In the above form of structure, the first tab 122 of the battery cell 10 is electrically connected to the electrode terminal 13. The second tab 123 is electrically connected to the second wall. Serving as a negative electrode of the battery cell 10, the shell 11 is electrically connected to the outside, thereby simplifying the structure of the battery cell 10.

As shown in FIG. 3 and FIG. 4, in some embodiments of this application, the shell 11 includes a housing 111 and an end cap 112. The housing 111 includes a bottom wall 1111 and a sidewall 1112. The sidewall 1112 encloses the bottom wall 1111. One end of the sidewall 1112 is connected to the bottom wall 1111, and the other end of the sidewall forms an opening 113. The end cap 112 covers the opening 113. The first wall is the bottom wall 1111, and the second wall is the end cap 112.

In the above form of structure, the injection port 1121 is made on the end cap 112, so as to be easily formable. The electrode terminal 13 is disposed on the bottom wall 1111. The current collection component 14 is disposed between the bottom wall 1111 and the electrode assembly 12, thereby making it practicable to weld the electrode terminal 13 to the current collection component 14 first and then cover the opening 113 with the end cap 112, and in turn, simplifying the assembling process of the battery cell 10.

Figures 5, 6:
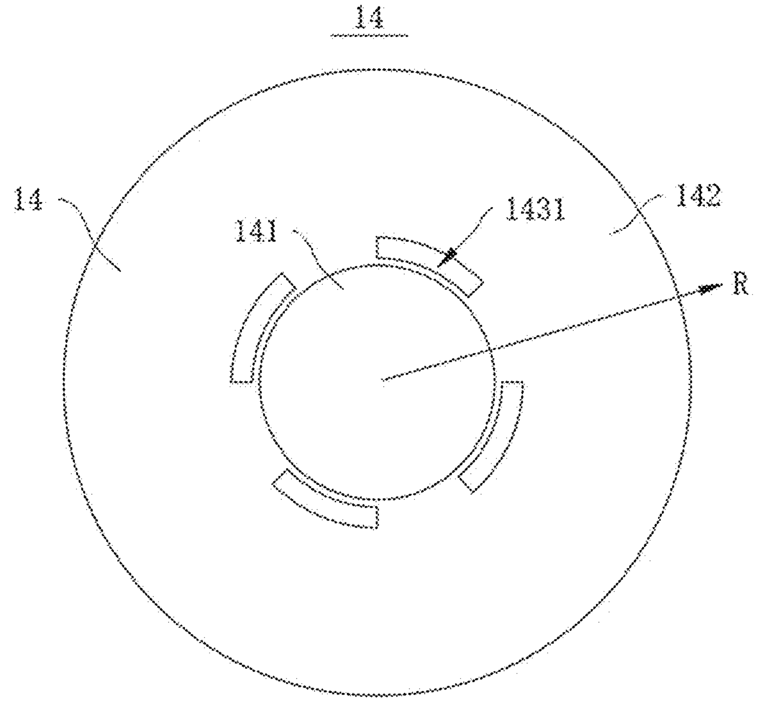
FIG. 5 is a schematic structural diagram of a first form of current collection component of a battery cell according to some embodiments of this application.
FIG. 6 is a schematic structural diagram of how a guide channel of the current collection component shown in FIG. 5 fits with a center hole.

FIG. 5 is a schematic structural diagram of a first form of current collection component of a battery cell according to some embodiments of this application, and FIG. 6 is a schematic structural diagram of how a guide channel of the current collection component shown in FIG. 5 fits with a center hole.

As shown in FIG. 5 and FIG. 6, in some embodiments of this application, the guide channel is a first through-hole 1431, and the first through-hole 1431 is located at an edge of the center portion 141.

The "edge of the center portion 141" may be a transition structure between the center portion 141 and the periphery portion 142, or may be a part of the periphery portion 142, the part being close to the center portion 141.

The first through-hole 1431 runs through the current collection component 14 along a thickness direction of the current collection component 14, so as to guide the electrolytic solution to enter a side of the current collection component 14, the side being away from the electrode assembly 12. In this way, the electrolytic solution is further diffused to the periphery portion 142.

As shown in FIG. 5 and FIG. 6, in some embodiments of this application, the current collection component 14 is of a flat panel structure with a level surface. The center portion 141 is directly connected to the periphery portion 142. On a plane perpendicular to the first axis P, the center portion 141 is flush with the surface of the periphery portion 142. The axial direction of the first through-hole 1431 is parallel to the first axis P.

In other embodiments, the current collection component 14 may be of a flat panel structure with a non-level surface instead. On the plane perpendicular to the first axis P, the center portion 141 protrudes beyond the periphery portion 142. The transition portion 143 connects the center portion 141 and the periphery portion 142. The axial direction of the first through-hole 1431 is parallel to the first direction R.

One first through-hole 1431 may be provided alone. All the electrolytic solution in the center hole 1211 is diffused from the center portion 141 to the periphery portion 142 through one first through-hole 1431. Alternatively, a plurality of first through-holes 1431 may be provided, and the plurality of first through-holes 1431 are distributed at intervals around the first axis P circumferentially. The electrolytic solution in the center hole 1211 enters the plurality of first through-holes 1431. The plurality of first through-holes 1431 jointly guide the electrolytic solution to diffuse from the center portion 141 to the periphery portion 142. The first through-hole 1431 may be a round hole, or an elliptical hole, a rectangular hole, a triangular hole, or an arc-shaped hole.

In the above form of structure, the first through-hole 1431 is located at the edge of the center portion 141. Through the first through-hole 1431, the electrolytic solution flows from one side to the other side of the current collection component 14, the one side being close to the electrode assembly 12, and the other side being close to the first wall. In this way, the electrolytic solution is diffused to the periphery portion 142 to quickly and sufficiently infiltrate the electrode assembly 12.

Figure 7:
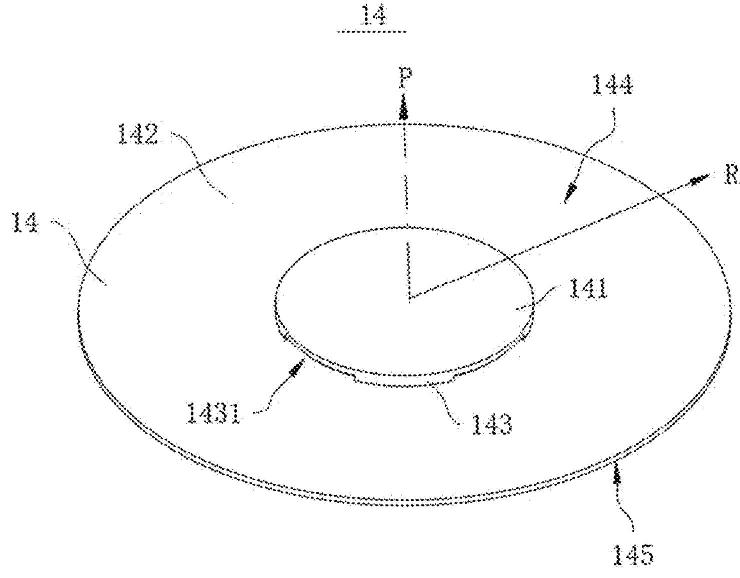
FIG. 7 is a schematic structural diagram of a second form of current collection component of a battery cell according to some embodiments of this application.
Figure 8:
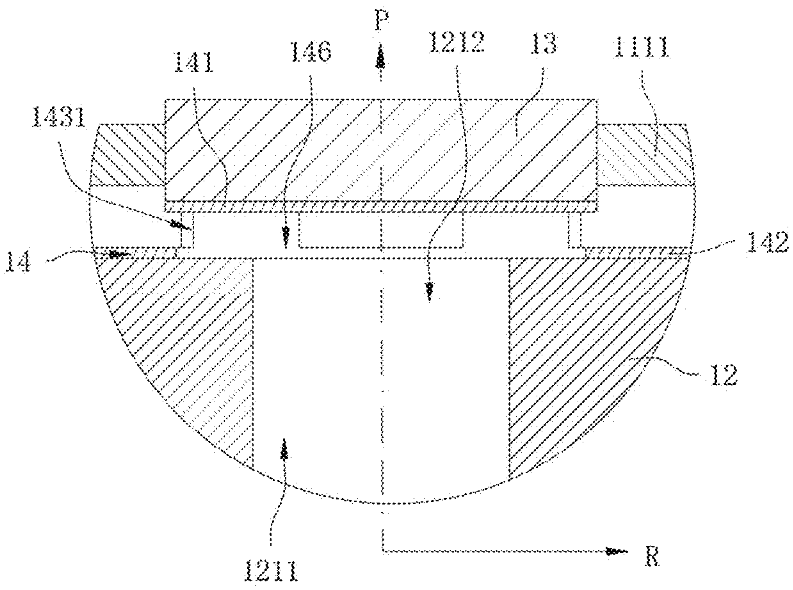
FIG. 8 is a schematic structural diagram of how a guide channel of the current collection component shown in FIG. 7 fits with a center hole.

FIG. 7 is a schematic structural diagram of a second form of current collection component of a battery cell according to some embodiments of this application, and FIG. 8 is a schematic structural diagram of how a guide channel of the current collection component shown in FIG. 7 fits with a center hole.

As shown in FIG. 7 and FIG. 8, in some embodiments of this application, the center portion 141 protrudes beyond the periphery portion 142 toward the electrode terminal 13. The current collection component 14 further includes a transition portion 143. The transition portion 143 encloses the center portion 141. The transition portion 143 connects the center portion 141 and the periphery portion 142. The first through-hole 1431 is disposed in the transition portion 143.

Along the extension direction of the first axis P, the center portion 141 protrudes beyond the periphery portion 142 toward the electrode terminal 13 and is connected to the electrode terminal 13. The transition portion 143 connects the center portion 141 and the periphery portion 142, thereby electrically connecting the center portion 141 and the periphery portion 142 and facilitating formation of the first through-hole 1431 in the transition portion 143.

Along the extension direction of the first axis P, the first through-hole 1431 may be made in the middle of the transition portion 143, or may be made on a side of the transition portion 143, the side being close to the center portion 141 or the periphery portion 142. The first through-hole 1431 may be entirely located in the transition portion 143, or may extend to the center portion 141 or the periphery portion 142 through the transition portion 143.

The center portion 141 may protrude toward the electrode terminal 13 in various ways. The center portion 141 may be formed by a stamping process; or, the center portion 141 and the periphery portion 142 are provided independently and then welded together.

The center portion 141 and the transition portion 143 close in to form an electrolyte storage space 146 that communicates with the first end 1212 of the center hole 1211. The first through-hole 1431 runs through the transition portion 143 along the thickness direction of the transition portion 143, so that the electrolytic solution is guided to flow from the electrolyte storage space 146 to a side of the current collection component 14, the side being away from the electrode assembly 12. The thickness direction of the transition portion 143 may extend along the first direction R, or may extend along another direction inclined against the first axis P.

In the above form of structure, the center portion 141 protrudes beyond the periphery portion 142 toward the electrode terminal 13, and combines with the transition portion 143 to form an electrolyte storage space 146 that communicates with the center hole 1211. The first through-hole 1431 is made in the transition portion 143. Therefore, after entering the electrolyte storage space 146 along the axial direction of the center hole 1211, the electrolytic solution flows along a perforation direction of the first through-hole 1431 to a side of the current collection component 14, the side being close to the first wall. Because the electrolytic solution continues to diffuse to the periphery portion 142 along the perforation direction of the first through-hole 1431, the electrolytic solution can infiltrate the electrode assembly 12 quickly and sufficiently.

As shown in FIG. 7 and FIG. 8, in some embodiments of this application, the first through-hole 1431 is plural in number. The plurality of first through-holes 1431 are disposed around the center portion 141 at intervals.

Specifically, the transition portion 143 is disposed around the first axis P, and the radial direction of the transition portion 143 extends along the first direction R. Axes of the plurality of first through-holes 1431 are located on the same plane perpendicular to the first axis P.

As shown in FIG. 7, in some embodiments of this application, the shape and opening size are identical between the plurality of first through-holes 1431, so that all the first through-holes 1431 allow passage of the same amount of electrolytic solution. The plurality of first through-holes 1431 are arranged evenly around the center portion 141 circumferentially so that the electrolytic solution is guided to diffuse circumferentially at equal intervals.

In other embodiments, the shape and opening size may vary between the plurality of first through-holes 1431. The plurality of first through-holes 1431 may be arranged unevenly instead around the center portion 141 circumferentially. By flexibly arranging the location and number of the first through-holes 1431, the space required by other components inside the battery cell 10 is vacated, and the strength of the current collection component 14 is increased, thereby preventing the current collection component 14 from fracturing due to excessive holes made in the transition portion 143.

The number of the first through-holes 1431 may be two to six, thereby not only increasing the diffusion speed of the electrolytic solution, but also ensuring the strength of the current collection component 14.

For example, as shown in FIG. 7, four first through-holes 1431 are made. The four first through-holes 1431 are arranged in the transition portion 143 at intervals around the first axis P circumferentially. Two adjacent first through-holes 1431 are arranged at intervals of 90° around the first axis P.

In the above form of structure, the plurality of first through-holes 1431 are arranged around the center portion 141 at intervals, thereby guiding the electrolytic solution to diffuse to the periphery portion 142 around the center portion 141 circumferentially, and making the electrolytic solution infiltrate the electrode assembly 12 quickly and sufficiently.

In some embodiments of this application, along a circumference of the center portion 141, a total length of the plurality of first through-holes 1431 is greater than or equal to ½ of a perimeter of the transition portion 143.

Understandably, "the total length of the transition portion 143 along the circumference of the center portion 141" means a length of the outer sidewall 1112 of the transition portion 143 in circumference around the first axis P along the extension direction of the first axis P, as measured at a middle position of a part perforated with the first through-holes 1431. The "total length of the plurality of first through-holes 1431 along the circumference of the center portion 141" means a total length occupied by all the first through-holes 1431 as measured at the "middle position of a part perforated with the first through-holes 1431".

Based on the implementation of "one first through-hole 1431 is provided alone", the first through-hole 1431 is made in the transition portion 143 in an all-through manner around the first axis P, and occupies at least an 180° segment of the circumference of the transition portion 143. The remaining segment of the circumference of the transition portion 143 is a connection region. The connection region is configured to connect the center portion 141 and the periphery portion 142. Based on the implementation of "the four first through-holes 1431 are arranged at equal intervals around the center portion 141", each first through-hole 1431 occupies at least a 45° segment of the circumference of the transition portion 143. Two adjacent first through-holes 1431 are interspaced with a connection region. The connection region is configured to connect the center portion 141 and the periphery portion 142.

In the above form of structure, the flow area of the transition portion 143 is smaller than the flow area of the center portion 141 and the periphery portion 142. Therefore, when an internal current of the battery cell 10 is excessive, the current collection component 14 can be fused off in time, thereby electrically disconnecting the electrode terminal 13 from the first tab 122, and achieving relatively high safety performance of the battery cell 10.

In some embodiments of this application, the first through-hole 1431 is an arc-shaped hole that extends along a circumference of the center portion 141.

Understandably, that "the first through-hole 1431 is an arc-shaped hole that extends along a circumference of the center portion 141" means that, on a plane perpendicular to the first axis P, a projection of the first through-hole 1431 assumes an arc shape that curves around the first axis P.

Based on the implementation of "the four first through-holes 1431 are arranged around the center portion 141 at equal intervals", all the four first through-holes 1431 are arc-shaped holes that extend along the circumference of the center portion 141.

In the above form of structure, the first through-hole 1431 is an arc-shaped hole that extends along the circumference of the center portion 141, thereby not only increasing the opening area of the first through-hole 1431 and facilitating diffusion of the electrolytic solution, but also reducing a protruding height by which the center portion 141 protrudes beyond the periphery portion 142, thinning the current collection component 14, making the battery cell 10 structurally compact, and achieving a relatively high energy density.

Figures 9, 10:
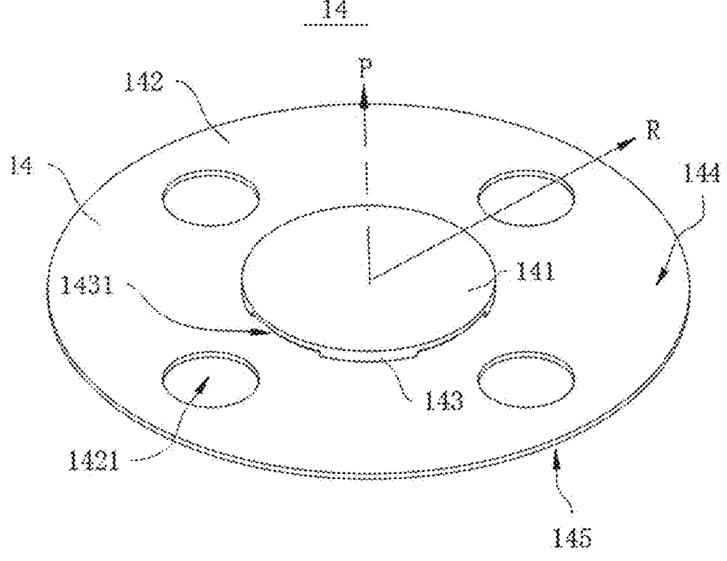
FIG. 9 is a schematic structural diagram of a third form of current collection component of a battery cell according to some embodiments of this application.
FIG. 10 is a schematic structural diagram of how a guide channel of the current collection component shown in FIG. 9 fits with a center hole.

FIG. 9 is a schematic structural diagram of a third form of current collection component of a battery cell according to some embodiments of this application, and FIG. 10 is a schematic structural diagram of how a guide channel of the current collection component shown in FIG. 9 fits with a center hole.

As shown in FIG. 9 and FIG. 10, in some embodiments of this application, a second through-hole 1421 is made on the periphery portion 142. The second through-hole 1421 is farther away from the center portion 141 than the first through-hole 1431.

The second through-hole 1421 runs through the periphery portion 142 along the thickness of the periphery portion 142. On the plane perpendicular to the first axis P, a projection of the second through-hole 1421 can fully fall within a projection of the electrode assembly 12. The electrolytic solution enters the clearance between two adjacent layers of electrode plate of the electrode assembly 12 through the second through-hole 1421 to infiltrate the electrode assembly 12. The projection of the second through-hole 1421 can partly fall within the projection of the electrode assembly 12. A part of the electrolytic solution enters the clearance between the two adjacent layers of electrode plate of the electrode assembly 12 through the second through-hole 1421, and another part of the electrolytic solution flows to the edge of the electrode assembly 12 to enter a gap between the electrode assembly 12 and the shell 11 (referring to FIG. 4), thereby quickly and sufficiently entering the electrode assembly 12.

One second through-hole 1421 may be provided alone. All the electrolytic solution enters the electrode assembly 12 from the periphery portion 142 through one second through-hole 1421. Alternatively, a plurality of second through-holes 1421 may be provided. The plurality of second through-holes 1421 are distributed at intervals around the first axis P circumferentially. The electrolytic solution enters the plurality of second through-holes 1421. The plurality of second through-holes 1421 jointly guide the electrolytic solution into the electrode assembly 12 from the periphery portion 142, so as to evenly infiltrate the electrode assembly 12 circumferentially. Alternatively, a plurality of groups of second through-holes 1421 may be provided. The plurality of groups of second through-holes 1421 are distributed around the first axis P circumferentially at intervals. Each group of second through-holes 1421 includes a plurality of second through-holes 1421 arranged at intervals along the first direction R, so as to sufficiently guide the electrolytic solution to diffuse in the first direction R.

The second through-hole 1421 may be a round hole, or an elliptical hole, a rectangular hole, a triangular hole, or a hole in other shapes.

In the above form of structure, the second through-hole 1421 is made in the periphery portion 142, and can partly expose a clearance between two adjacent layers of electrode plate of the electrode assembly. Through the second through-hole 1421, the electrolytic solution can enter the clearance between the two adjacent layers of electrode plate of the electrode assembly 12 to infiltrate the electrode assembly 12 quickly and sufficiently.

As shown in FIG. 9, in some embodiments of this application, the second through-hole 1421 is plural in number. The plurality of second through-holes 1421 are disposed around the center portion 141 at intervals.

As shown in FIG. 9, in some embodiments of this application, the shape and opening size may be identical between the plurality of second through-holes 1421, so that all the second through-holes 1421 allow passage of the same amount of electrolytic solution. The plurality of second through-holes 1421 may be arranged evenly around the center portion 141 circumferentially so that the electrolytic solution is guided to diffuse circumferentially at equal intervals.

In other embodiments, the shape and opening size may vary between the plurality of second through-holes 1421. The plurality of second through-holes 1421 may be arranged unevenly instead around the center portion 141 circumferentially. By flexibly arranging the location and number of the second through-holes 1421, the space required by other components inside the battery cell 10 is vacated, and the strength of the current collection component 14 is increased, thereby preventing the current collection component from being prone to fracture due to excessive holes made in the transition portion 143.

As shown in FIG. 9, in some embodiments of this application, the second through-holes 1421 may be disposed corresponding to the first through-holes 1431. Based on the implementation of "the four first through-holes 1431 are arranged around the center portion 141 at equal intervals", four first through-holes 1431 are provided, and four second through-holes 1421 are provided. The first through-holes 1431 are in one-to-one correspondence with the second through-holes 1421. The second through-holes 1421 and the corresponding first through-holes 1431 are arranged at intervals along the radial direction of the battery cell 10 (that is, the first direction R). In this way, the electrolytic solution is guided to flow from the first through-holes 1431 to the second through-holes 1421 along the first direction R, and to enter the electrode assembly 12 through the second through-holes 1421.

In other embodiments, the number and locations of the second through-holes 1421 may be disposed independently from the number and locations of the first through-holes 1431. For example, four first through-holes 1431 are made. The four first through-holes 1431 are arranged in the transition portion 143 around the first axis P at equal intervals. Six second through-holes 1421 are made. The six second through-holes 1421 are arranged in the periphery portion 142 around the first axis P at equal intervals.

In the above form of structure, the plurality of second through-holes 1421 are arranged around the center portion 141 at intervals, thereby guiding the electrolytic solution to flow around the center portion 141 circumferentially into the clearance between the two adjacent layers of electrode plate of the electrode assembly 12 to infiltrate the electrode assembly 12 quickly and sufficiently.

Figure 11:
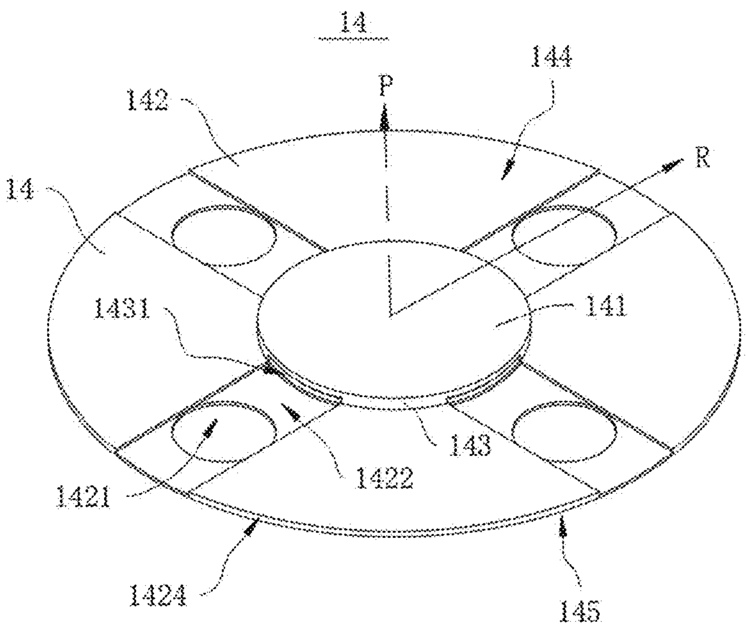
FIG. 11 is a schematic structural diagram of a third form of current collection component of a battery cell according to some embodiments of this application.
Figure 12:
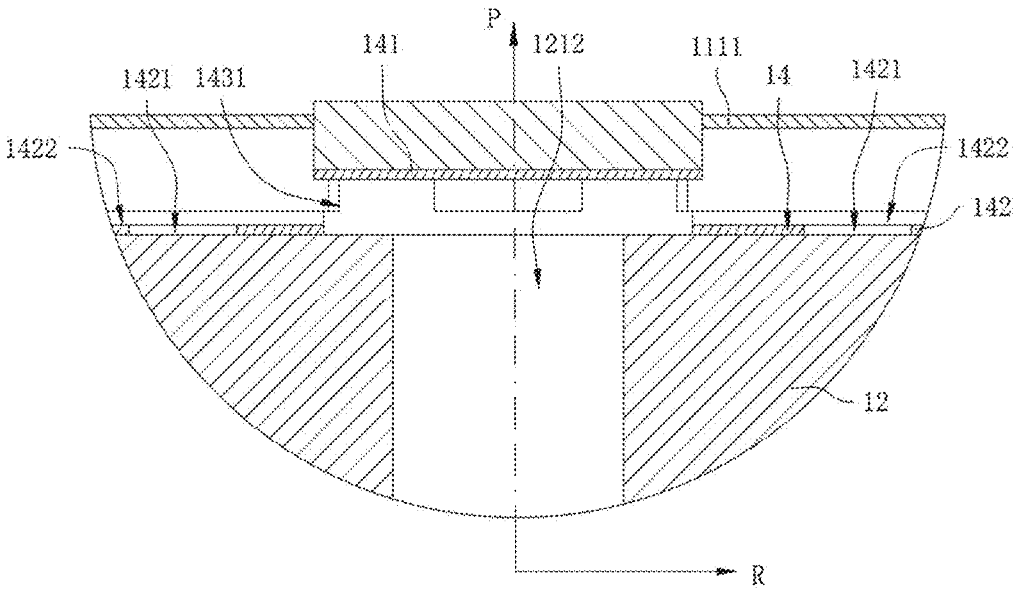
FIG. 12 is a schematic structural diagram of how a guide channel of the current collection component shown in FIG. 11 fits with a center hole.

FIG. 11 is a schematic structural diagram of a third form of current collection component of a battery cell according to some embodiments of this application, and FIG. 12 is a schematic structural diagram of how a guide channel of the current collection component shown in FIG. 11 fits with a center hole.

As shown in FIG. 11 and FIG. 12, in some embodiments of this application, a first groove 1422 is made on a side of the periphery portion 142, the side being away from the electrode assembly 12. The first groove 1422 is configured to communicate with the first through-hole 1431 and the second through-hole 1421.

Along the thickness direction of the current collection component 14, a first surface 144 is included in a side of the current collection component 14, the side being away from the electrode assembly 12. A second surface 145 is included in a side oriented toward the electrode assembly 12. The first groove 1422 is made on the first surface 144.

The first groove 1422 may be formed by a stamping process, or may be formed by a planing and milling process. One end of the first groove 1422 communicates with the first through-hole 1431, and the other end of the first groove may extend to the second through-hole 1421. The first through-hole 1431 may be formed inside the first groove 1422 instead, and the other end of the first groove 1422 extends to the edge of the periphery portion 142. The first groove 1422 may extend along the first direction R, or extend helically around the first axis P or extend along other directions.

A depth of the first groove 1422 may be uniform along the extension direction of the first groove 1422, so as to simplify the shape of the first groove 1422 and make it easy to process and form the current collection component 14. The depth of the first groove 1422 may vary instead along the extension direction of the first groove 1422, so as to guide rapid diffusion of the electrolytic solution. For example, the depth of the first groove 1422 increases gradually in a direction from the first through-hole 1431 to the second through-hole 1421. A width of the first groove 1422 may be uniform, so as to simplify the shape of the first groove 1422 and make it easy to process and form the current collection component 14. The width of the first groove 1422 may vary instead along the extension direction of the first groove 1422, so as to guide rapid diffusion of the electrolytic solution. For example, the width of the first groove 1422 increases gradually in a direction from the first through-hole 1431 to the second through-hole 1421.

As shown in FIG. 11, in some embodiments of this application, in a direction around the first axis P, diameters of the first through-hole 1431 and the second through-hole 1421 are identical to the width of the first groove 1422, so as to reduce the perforation area of the first groove 1422, and make the current collection component 14 stronger and less prone to break off. In other embodiments, the width of the first groove 1422 may be greater than the diameters of the first through-hole 1431 and the second through-hole 1421 instead, so as to increase the diffusion speed of the electrolytic solution.

As shown in FIG. 11, based on the implementation of "the four first through-holes 1431 are arranged around the center portion 141 at equal intervals, and the second through-holes 1421 are arranged corresponding to the first through-holes 1431", four first grooves 1422 are provided. The four first grooves 1422 are arranged around the first axis P at intervals. Each first groove 1422 communicates with the corresponding first through-hole 1431 and second through-hole 1421.

In the above form of structure, the first groove 1422 is made on a side of the periphery portion 142, the side being away from the electrode assembly 12. In addition, the first groove 1422 communicates with the first through-hole 1431 and the second through-hole 1421, and can guide the electrolytic solution to flow from the first through-hole 1431 to the second through-hole 1421 to enter the electrode assembly 12, thereby increasing a space of the current collection component 14 at a side away from the electrode assembly 12, and increasing the diffusion speed of the electrolytic solution.

As shown in FIG. 11, in some embodiments of this application, the first groove 1422 extends to an outer peripheral surface of the periphery portion 142 along a radial direction of the electrode assembly 12.

Specifically, the outer peripheral surface of the periphery portion 142 around the first axis P is a first outer peripheral surface 1424. The first groove 1422 may extend along the first direction R, or extend helically around the first axis P, or extend along other directions.

As shown in FIG. 11, based on the implementation of "the four first through-holes 1431 are arranged around the center portion 141 at equal intervals, and the second through-holes 1421 are arranged corresponding to the first through-holes 1431", the first through-holes 1431 and the corresponding second through-holes 1421 are arranged at intervals along the first direction R. The first groove 1422 extends to the first outer peripheral surface 1424 along the first direction R to communicate with the first through-hole 1431 and the corresponding second through-hole 1421.

In the above form of structure, the first groove 1422 extends to the outer peripheral surface of the periphery portion 142, and can guide excess electrolytic solution to flow into the clearance between the electrode assembly 12 and the shell 11. In this way, the electrolytic solution fills in the shell 11 quickly to infiltrate the electrode assembly 12 sufficiently.

Figure 13:
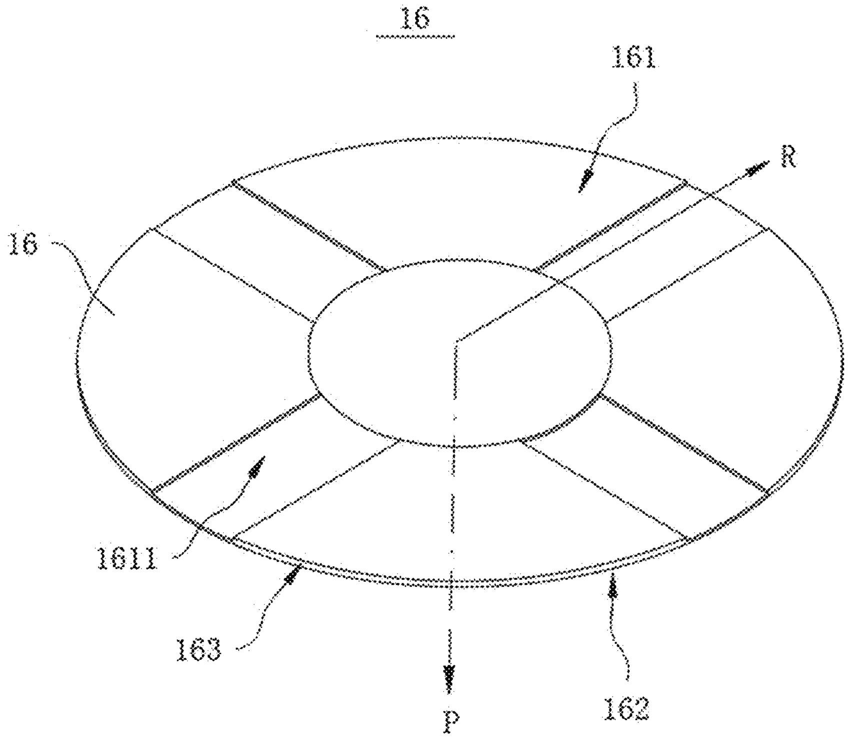
FIG. 13 is a schematic structural diagram of an insulator in a battery cell according to some embodiments of this application.
Figure 14:
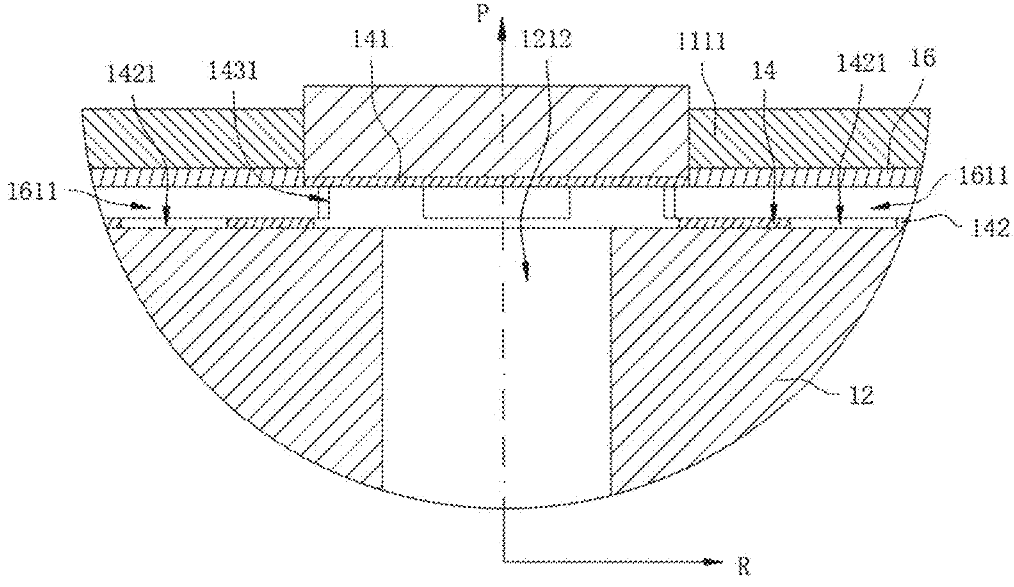
FIG. 14 is a schematic structural diagram of how the insulator in FIG. 13 fits with a guide channel of a current collection component.

FIG. 13 is a schematic structural diagram of an insulator in a battery cell according to some embodiments of this application, and FIG. 14 is a schematic structural diagram of how the insulator in FIG. 13 fits with a guide channel of a current collection component.

As shown in FIG. 13 and FIG. 14, in some embodiments of this application, the battery cell 10 further includes: an insulator 16, disposed between the current collection component 14 and the first wall, and configured to dielectrically insulate the current collection component 14 from the first wall. A second groove 1611 is made on a side of the insulator 16, the side being oriented toward the current collection component 14. The second groove 1611 is configured to communicate with the first through-hole 1431 and the second through-hole 1421.

The thickness direction of the insulator 16 extends along the first axis P. Of the insulator 16, the side oriented toward the current collection component 14 includes a third surface 161, and the side oriented toward the first wall includes a fourth surface 162. The second groove 1611 is made on the third surface 161.

The shape of the insulator 16 may match the shape of the housing 111. For example, when the housing 111 is a cylinder, the shape of the insulator 16 is of a circular plate-shaped structure. The shape of the insulator 16 may be independent of the shape of the housing 111 instead. For example, when the housing 111 is a cylinder, the shape of the insulator 16 may be of a quadrilateral plate-shaped structure.

Based on the implementation of "the first wall is a bottom wall 1111", the insulator 16 is a lower plastic sheet configured to dielectrically insulate the current collection component 14 from the bottom wall 1111. Alternatively, the insulator 16 may be an additional component to facilitate diffusion of the electrolytic solution.

The insulator 16 may be injection-molded. The second groove 1611 is directly formed on the third surface 161 of the insulator 16, or the second groove 1611 may be formed by planing. One end of the second groove 1611 communicates with the first through-hole 1431, and the other end of the second groove may extend to the second through-hole 1421. The second groove 1611 may extend to the edge of the insulator 16 instead. On a plane perpendicular to the first axis P, a projection of the second through-hole 1421 falls within a projection of the second groove 1611. The second groove 1611 may extend along the first direction R, or extend helically around the first axis P, or extend along other directions.

A depth of the second groove 1611 may be uniform along the extension direction of the second groove 1611, so as to simplify the shape of the second groove 1611 and make it easy to process and form the insulator 16. The depth of the second groove 1611 may vary instead along the extension direction of the second groove 1611, so as to guide rapid diffusion of the electrolytic solution. For example, the depth of the second groove 1611 increases gradually in a direction from the first through-hole 1431 to the second through-hole 1421. A width of the second groove 1611 may be uniform, so as to simplify the shape of the second groove 1611 and make it easy to process and form the current collection component 14. The width of the second groove 1611 may vary instead along the extension direction of the second groove 1611, so as to guide rapid diffusion of the electrolytic solution. For example, the width of the second groove 1611 increases gradually in a direction from the first through-hole 1431 to the second through-hole 1421.

In a direction around the first axis P, diameters of the first through-hole 1431 and the second through-hole 1421 may be identical to the width of the second groove 1611, so as to reduce the perforation area of the second groove 1611, and make the current collection component 14 stronger and less prone to break off. The width of the second groove 1611 may be greater than the diameters of the first through-hole 1431 and the second through-hole 1421 instead, so as to increase the diffusion speed of the electrolytic solution.

The second groove 1611 may be arranged corresponding to the first groove 1422 to increase the diffusion speed of the electrolytic solution. For example, based on the implementation of "the four first through-holes 1431 are arranged around the center portion 141 at equal intervals, the second through-holes 1421 are arranged corresponding to the first through-holes 1431, four first grooves 1422 are provided, and each first groove 1422 communicates with the corresponding first through-hole 1431 and second through-hole 1421", four second grooves 1611 are also provided. On the plane perpendicular to the first axis P, the projection of the first groove 1422 coincides with the projection of the corresponding second groove 1611.

Figure 16:
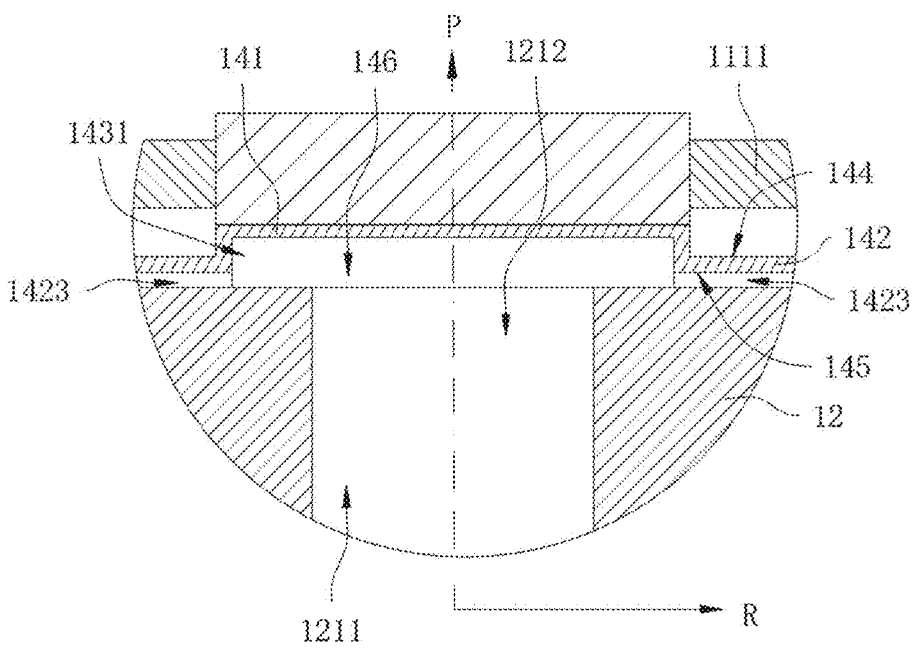
FIG. 16 is a schematic structural diagram of how a guide channel of the current collection component shown in FIG. 15 fits with a center hole.

The second groove 1611 may be provided independently from the first groove 1422 to simplify the assembling and positioning requirements of the current collection component 14 and the insulator 16. For example, on the plane perpendicular to the first axis P, the projection of the first groove 1422 partly coincides with the projection of the corresponding second groove 1611. For another example, as shown in FIG. 16, no first groove 1422 is made on the first surface 144 of the current collection component 14, and the first through-hole 1431 communicates with the corresponding second through-hole 1421 through only one second groove 1611.

In the above form of structure, the electrolytic solution flowing out of the first through-hole 1431 enters the clearance between the insulator 16 and the current collection component 14. The second groove 1611 can guide the electrolytic solution to flow from the first through-hole 1431 to the second through-hole 1421 and to enter the electrode assembly 12, and can increase the space of the current collection component 14 at a side away from the electrode assembly 12, thereby increasing the diffusion speed of the electrolytic solution.

In some embodiments of this application, the second groove 1611 extends to an outer peripheral surface of the insulator 16 along the radial direction of the electrode assembly 12.

Specifically, the outer peripheral surface of the insulator 16 around the first axis P is a second outer peripheral surface 163. The second groove 1611 may extend along the first direction R, or extend helically around the first axis P, or extend along other directions.

Based on the implementation of "the four first through-holes 1431 are arranged around the center portion 141 at equal intervals, and the second through-holes 1421 are arranged corresponding to the first through-holes 1431", the first through-holes 1431 and the corresponding second through-holes 1421 are arranged at intervals along the first direction R. Four second grooves 1611 are provided. Each second groove 1611 extends to the second outer peripheral surface 163 along the first direction R to communicate with the first through-hole 1431 and the corresponding second through-hole 1421.

In the above form of structure, the second groove 1611 extends to the outer peripheral surface of the insulator 16, and can guide excess electrolytic solution to flow into the clearance between the electrode assembly 12 and the shell 11. In this way, the electrolytic solution fills in the shell 11 quickly to infiltrate the electrode assembly 12 sufficiently.

Figure 15:
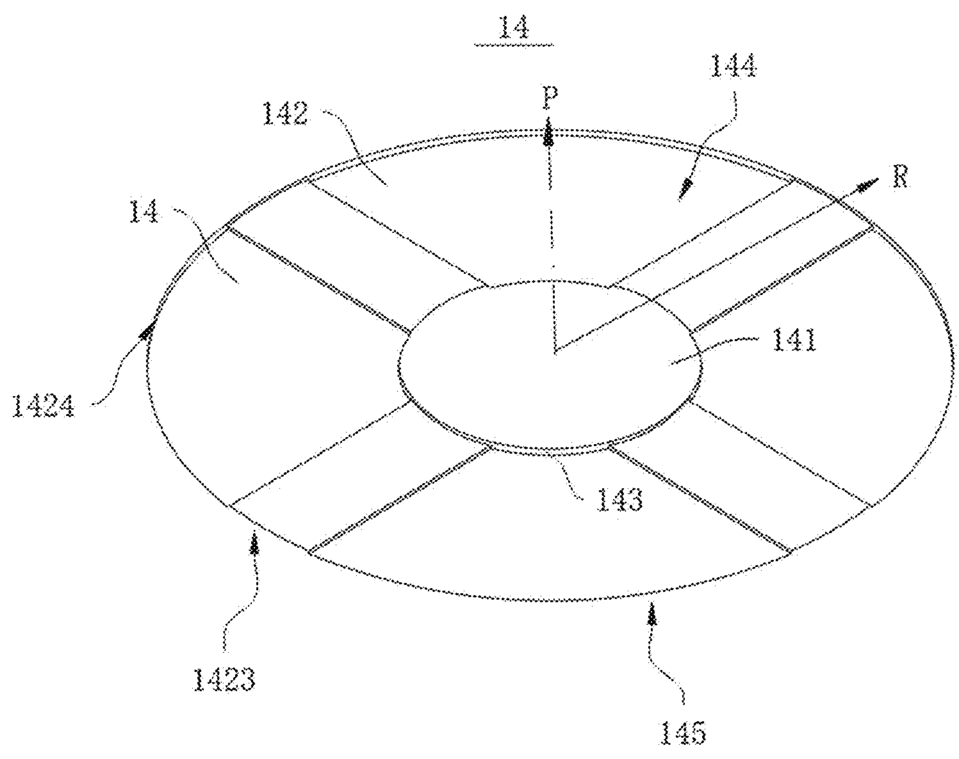
FIG. 15 is a schematic structural diagram of a fourth form of current collection component of a battery cell according to some embodiments of this application.

FIG. 15 is a schematic structural diagram of a fourth form of current collection component of a battery cell according to some embodiments of this application, and FIG. 16 is a schematic structural diagram of how a guide channel of the current collection component shown in FIG. 15 fits with a center hole.

As shown in FIG. 15 and FIG. 16, in some embodiments of this application, the guide channel is a third groove 1423. The third groove 1423 is made on a side of the periphery portion 142, the side being oriented toward the electrode assembly 12. The third groove 1423 communicates with the center hole 1211.

Specifically, a third groove 1423 is made on the second surface 145 of the current collection component 14. One end of the third groove 1423 extends to the center portion 141 to communicate with the center hole 1211, and the other end of the third groove may extend to the edge of the current collection component 14, or extend to the periphery portion 142. Based on the implementation of "the center portion 141 protrudes beyond the periphery portion 142 toward the electrode terminal 13", one end of the third groove 1423 communicates with the electrolyte storage space 146 to implement communication with the center hole 1211.

The third groove 1423 may be formed by a stamping process, or may be formed by a planing and milling process. The third groove 1423 may extend along the first direction R, or extend helically around the first axis P, or extend along other directions.

A depth of the third groove 1423 may be uniform along the extension direction of the third groove, so as to simplify the shape of the third groove 1423 and make it easy to process and form the current collection component 14. The depth of the third groove 1423 may vary instead along the extension direction of the third groove 1423, so as to guide rapid diffusion of the electrolytic solution. For example, the depth of the third groove 1423 increases gradually in a direction from the center portion 141 to the periphery portion 142. A width of the third groove 1423 may be uniform, so as to simplify the shape of the third groove 1423 and make it easy to process and form the current collection component 14. The width of the third groove 1423 may vary instead along the extension direction of the third groove 1423, so as to guide rapid diffusion of the electrolytic solution. For example, the width of the third groove 1423 increases gradually in a direction from the center portion 141 to the periphery portion 142.

One third groove 1423 may be provided alone. All the electrolytic solution is diffused from the center portion 141 to the periphery portion 142 through one third groove 1423. Alternatively, a plurality of third grooves 1423 may be provided, and the plurality of third grooves 1423 are distributed at intervals around the first axis P circumferentially. The electrolytic solution enters the plurality of third grooves 1423. The plurality of third grooves 1423 jointly guide the electrolytic solution to diffuse from the center portion 141 to the periphery portion 142, so as to evenly infiltrate the electrode assembly 12 circumferentially.

In the above form of structure, the electrolytic solution in the center hole 1211 enters the clearance between the electrode assembly 12 and the current collection component 14. The third groove 1423 can guide the electrolytic solution to diffuse to the peripheral portion 142, thereby increasing the diffusion speed of the electrolytic solution.

In some embodiments of this application, the third groove 1423 extends to an outer peripheral surface of the periphery portion 142 along a radial direction of the electrode assembly 12.

The third groove 1423 may extend along the first direction R, or extend helically around the first axis P, or extend along other directions. Based on the implementation of "a plurality of third grooves 1423 are distributed at intervals around the first axis P circumferentially", one end of each third groove 1423 communicates with the center hole 1211, and the other end of the third groove extends to the first outer peripheral surface 1424 of the periphery portion 142 along the first direction R. Based on the implementation of "one third groove 1423 may be provided alone", one end of the third groove 1423 communicates with the center hole 1211, and the other end of the third groove helically extends around the first axis P to the first outer peripheral surface 1424 of the periphery portion 142.

In the above form of structure, the third groove 1423 extends to the outer peripheral surface of the periphery portion 142, and can guide excess electrolytic solution to flow into the clearance between the electrode assembly 12 and the shell 11. In this way, the electrolytic solution fills in the shell 11 quickly to infiltrate the electrode assembly 12 sufficiently.

Some embodiments of this application disclose a battery 100, including the battery cell 10.

Some embodiments of this application disclose an electrical device, including the battery 100.

Figure 17:
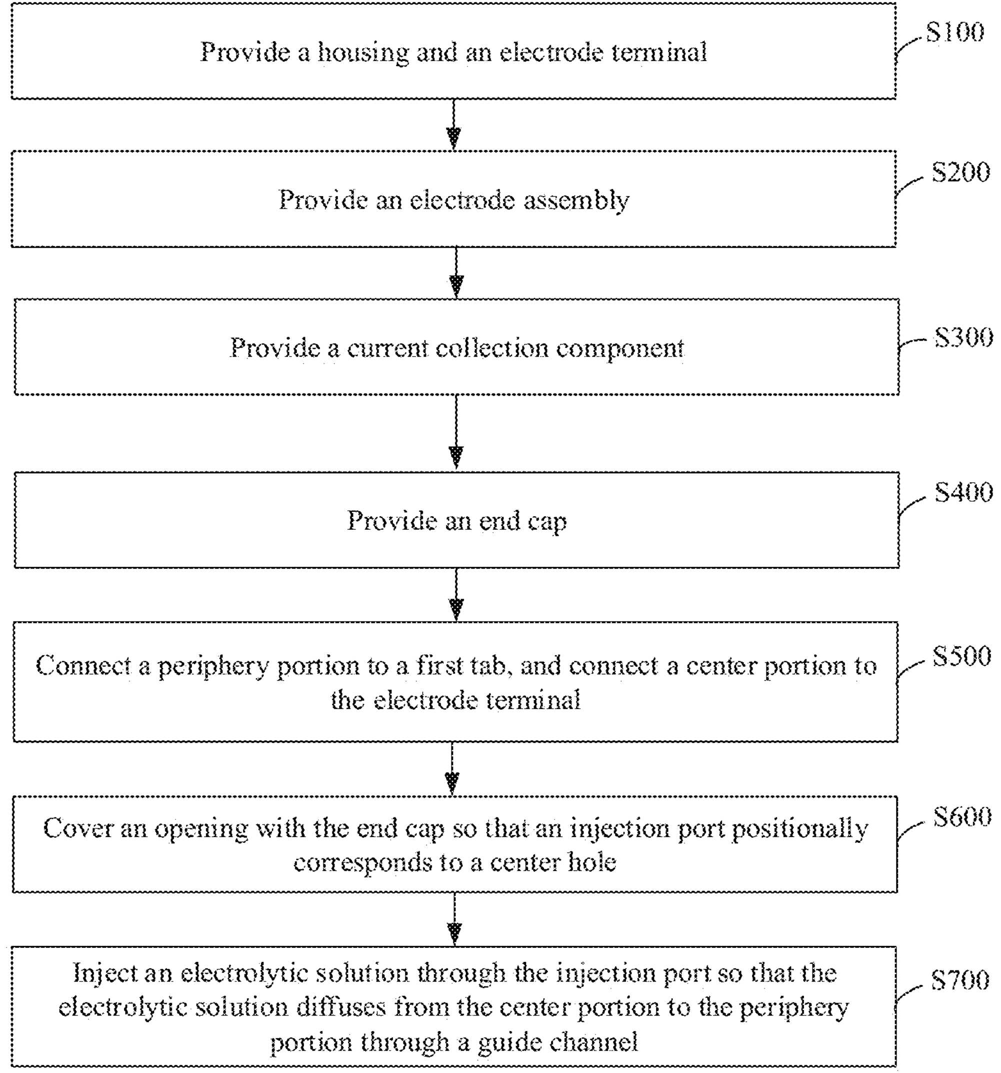
FIG. 17 is a schematic diagram of a method for manufacturing a battery cell according to some embodiments of this application.

FIG. 17 is a schematic diagram of a method for manufacturing a battery cell according to some embodiments of this application.

As shown in FIG. 17, some embodiments of this application disclose a method for manufacturing a battery cell 10. The method includes the following steps:

S100: Provide a housing 111 and an electrode terminal 13, where the housing 111 includes a bottom wall 1111 and a sidewall 1112, the sidewall 1112 encloses the bottom wall 1111, one end of the sidewall 1112 is connected to the bottom wall 1111, another end of the sidewall forms an opening 113, and the electrode terminal 13 is dielectrically mounted on the bottom wall 1111.

S200: Provide an electrode assembly 12, where the electrode assembly 12 includes a center hole 1211, a first tab 122 is formed at one end of the electrode assembly 12, and a second tab 123 is formed at another end of the electrode assembly;

S300: Provide a current collection component 14, where the current collection component 14 includes a center portion 141 and a periphery portion 142, and a guide channel is disposed on the current collection component 14.

S400: Provide an end cap 112, where an injection port 1121 is made on the end cap 112.

S500: Connect the periphery portion 142 to the first tab 122, make the center portion 141 positionally correspond to the center hole 1211, put the electrode assembly 12 into the housing 111, position the current collection component 14 between the bottom wall 1111 and the electrode assembly 12, and connect the center portion 141 to the electrode terminal 13.

S600: Cover the opening 113 with the end cap 112, and connect the end cap to the second tab 123 so that the injection port 1121 positionally corresponds to the center hole 1211.

S700: Inject an electrolytic solution into the housing 111 through the injection port 1121 so that the electrolytic solution enters the center hole 1211 and diffuses from the center portion 141 to the periphery portion 142 through the guide channel.

Figure 18:
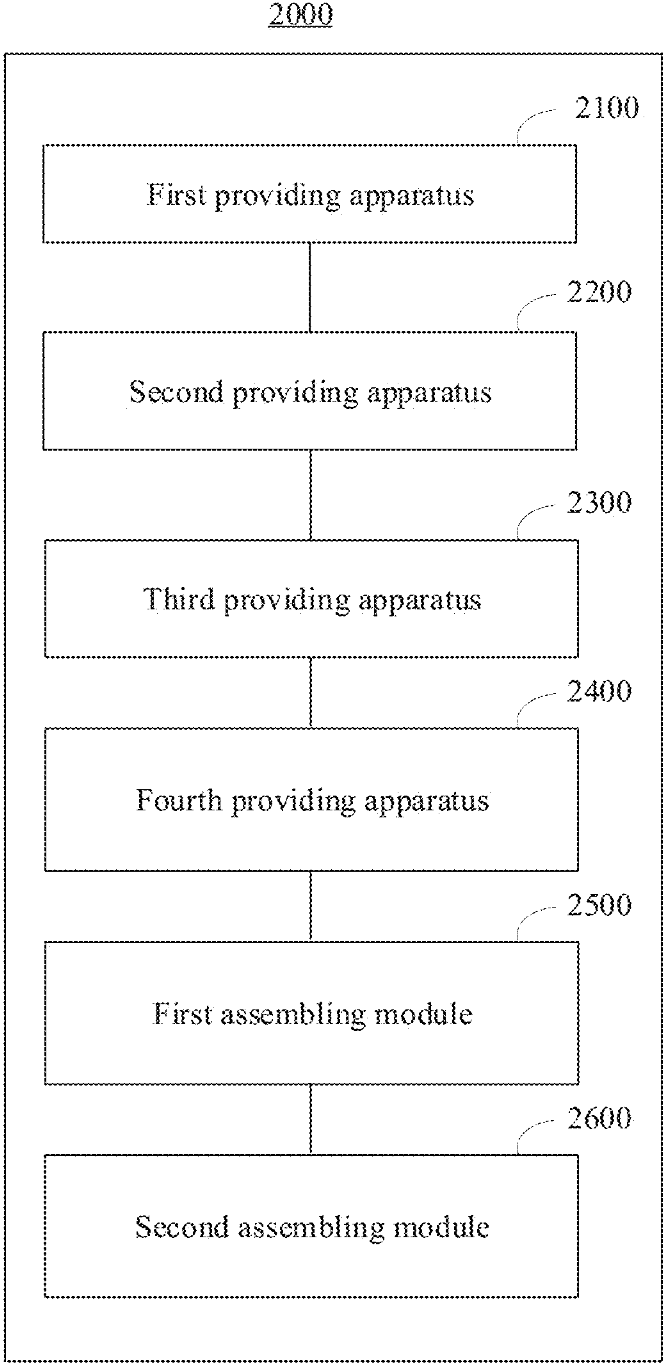
FIG. 18 is a schematic diagram of equipment for manufacturing a battery cell according to some embodiments of this application.

FIG. 18 is a schematic diagram of equipment for manufacturing a battery cell according to some embodiments of this application.

As shown in FIG. 18, some embodiments of this application disclose a piece of equipment 2000 for manufacturing a battery cell 10, including:

- a first providing apparatus 2100, configured to provide a housing 111 and an electrode terminal 13, where the housing 111 includes a bottom wall 1111 and a sidewall 1112, the sidewall 1112 encloses the bottom wall 1111, one end of the sidewall 1112 is connected to the bottom wall 1111, another end of the sidewall forms an opening 113, and the electrode terminal 13 is dielectrically mounted on the bottom wall 1111;
- a second providing apparatus 2200, configured to provide an electrode assembly 12, where the electrode assembly 12 includes a center hole 1211, a first tab 122 is formed at one end of the electrode assembly 12, and a second tab 123 is formed at another end of the electrode assembly;
- a third providing apparatus 2300, configured to provide a current collection component 14, where the current collection component 14 includes a center portion 141 and a periphery portion 142, and a guide channel is disposed on the current collection component 14;
- a fourth providing apparatus 2400, configured to provide an end cap 112, where an injection port 1121 is made on the end cap 112;
- a first assembling module 2500, configured to connect the periphery portion 142 to the first tab 122, make the center portion 141 positionally correspond to the center hole 1211, put the electrode assembly 12 into the housing 111, position the current collection component 14 between the bottom wall 1111 and the electrode assembly 12, and connect the center portion 141 to the electrode terminal 13; and cover the opening 113 with the end cap 112, and connect the end cap to the second tab 123 so that the injection port 1121 positionally corresponds to the center hole 1211; and
- a second assembling module 2600, configured to inject an electrolytic solution into the housing 111 through the injection port 1121 so that the electrolytic solution enters the center hole 1211 and diffuses from the center portion 141 to the periphery portion 142 through the guide channel.

As shown in FIG. 3, FIG. 4, FIG. 11, and FIG. 12, some embodiments of this application disclose a cylindrical battery, including a housing 111, an end cap 112, an electrode assembly 12, an electrode terminal 13, a positive current collection plate, a rivet, and a lower plastic sheet. An injection port 1121 is made on the end cap 112. The injection port 1121 is sealed by using a rivet. The electrode assembly 12 includes a positive tab and a negative tab. The positive tab is connected to a bottom wall 1111 of the housing 111 by the positive current collection plate. The lower plastic sheet dielectrically insulates the positive current collection plate from the bottom wall 1111. The negative tab contacts the end cap 112 through the negative current collection plate. The center of the positive current collection plate protrudes toward the bottom wall 1111 to form a center portion 141. A periphery portion 142 is disposed around the center portion 141 circumferentially. A first through-hole 1431 is made in the protruding sidewall. A surface of the periphery portion 142, located on the same side as the first through-hole 1431, is recessed to form a first groove 1422. The first groove 1422 extends along a radial direction of the positive current collection plate. A second through-hole 1421 is formed inside the radially extending first groove 1422. The second through-hole 1421 is configured to divert an electrolytic solution. During electrolyte injection, the injection port 1121 of the cylindrical battery is located at the bottom. The electrolytic solution flows upward from a center hole 1211 of the electrode assembly 12, enters the first groove 1422 through the first through-hole 1431 in the positive current collection plate, diffuses radially, flows to a clearance between the housing 111 and the electrode assembly 12, and enters the electrode assembly 12 through the second through-hole 1421, thereby improving the infiltration effect of the electrolytic solution of the entire cylindrical battery.

A hollowed-out length of the protruding sidewall of the positive current collection plate exceeds ½ of a circumference thereof, so as to function as a fuse. A groove of the positive current collection plate, oriented toward the bottom wall 1111, communicates with the first through-hole 1431 to guide the electrolytic solution into the first groove 1422. The number of second through-holes 1421 in each first groove 1422 may be 1, 2, or the like, and the shape of the second through-hole may be circular, triangular, rectangular, elliptical, or the like.

As shown in FIG. 3, FIG. 4, FIG. 13, and FIG. 14, some embodiments of this application disclose a cylindrical battery, including a housing 111, an end cap 112, an electrode assembly 12, an electrode terminal 13, a positive current collection plate, a rivet, and a lower plastic sheet. A first through-hole 1431 and a second through-hole 1421 are made in a positive current collection plate. A second groove 1611 is made on a surface of the lower plastic sheet, the surface being oriented toward the positive current collection plate. The second groove 1611 is in fit with the first through-hole 1431 and the second through-hole 1421. During electrolyte injection, the electrolytic solution enters the second groove 1611 from the first through-hole 1431, diffuses radially, flows to a clearance between the housing 111 and the electrode assembly 12, and enters the electrode assembly 12 through the second through-hole 1421, thereby improving the infiltration effect of the electrolytic solution of the entire cylindrical battery.

The width of the second groove 1611 and the height of protrusion from the center of the positive current collection plate are identical to the diameter of the second through-hole 1421.

As shown in FIG. 3, FIG. 4, FIG. 15, and FIG. 16, some embodiments of this application disclose a cylindrical battery, including a housing 111, an end cap 112, an electrode assembly 12, an electrode terminal 13, a positive current collection plate, a rivet, and a lower plastic sheet. The positive current collection plate protrudes toward the bottom wall 1111 to form a center portion 141. A periphery portion 142 is disposed around the center portion 141. A third groove 1423 is made on a surface of the periphery portion 142, the surface being oriented toward the electrode assembly 12. The third groove 1423 extends along a radial direction of the positive current collection plate. During electrolyte injection, the electrolytic solution flows upward from a center hole 1211 of the electrode assembly 12, diffuses inside the central protrusion of the positive current collection plate and along a radial direction of the third groove 1423, flows to a clearance between the housing 111 and the electrode assembly 12, and flows to the electrode assembly 12, thereby improving the infiltration effect of the electrolytic solution of the entire cylindrical battery.

The number of the third grooves 1423 may be two to six. A plurality of third grooves 1423 are circumferentially arranged in the positive current collection plate at intervals.

It is hereby noted that to the extent that no conflict occurs, the features in the embodiments of this application may be combined with each other.

What is described above is merely exemplary embodiments of this application, but is not intended to limit this application. To a person skilled in the art, various modifications and variations may be made to this application. Any modifications, equivalent replacements, improvements, and the like made without departing from the spirit and principles of this application still fall within the protection scope of this application.

What is claimed is:

1. A battery cell, comprising:

a shell, comprising a first wall;

an electrode terminal, dielectrically mounted on the first wall;

an electrode assembly, accommodated in the shell, wherein the electrode assembly comprises a center hole, and a first tab is formed at an end of the electrode assembly, the end being oriented toward the first wall;

a current collection structure, disposed between the first wall and the electrode assembly, wherein the current collection structure comprises a center portion and a periphery portion, the center portion positionally corresponds to the center hole, the center portion is configured to be connected to the electrode terminal, and the periphery portion is configured to be connected to the first tab; and a guide channel is disposed on the current collection structure, and the guide channel is configured to guide an electrolytic solution in the center hole to diffuse from the center portion to the periphery portion, wherein the guide channel is a first through-hole, and the first through-hole is located at an edge of the center portion, and a dimension of the first through-hole along a circumferential direction of the center hole is larger than a dimension of the first through-hole along a radial direction of the center hole.

2. The battery cell according to claim 1, wherein the center portion protrudes beyond the periphery portion toward the electrode terminal, the current collection structure further comprises a transition portion, the transition portion encloses the center portion, the transition portion connects the center portion and the periphery portion, and the first through-hole is disposed in the transition portion.

3. The battery cell according to claim 2, wherein the first through-hole is plural in number, and the plurality of first through-holes are disposed around the center portion at intervals.

4. The battery cell according to claim 3, wherein, along a circumference of the center portion, a total length of the plurality of first through-holes is greater than or equal to ½ of a perimeter of the transition portion.

5. The battery cell according to claim 1, wherein the first through-hole is an arc-shaped hole that extends along a circumference of the center portion.

6. The battery cell according to claim 1, wherein a second through-hole is made on the periphery portion, and the second through-hole is farther away from the center portion than the first through-hole.

7. The battery cell according to claim 6, wherein the second through-hole is plural in number, and the plurality of second through-holes are disposed around the center portion at intervals.

8. The battery cell according to claim 6, wherein a first groove is made on a side of the periphery portion, the side being away from the electrode assembly; and the first groove is configured to communicate with the first through-hole and the second through-hole.

9. The battery cell according to claim 8, wherein the first groove extends to an outer peripheral surface of the periphery portion along a radial direction of the electrode assembly.

10. The battery cell according to claim 6, wherein the battery cell further comprises:

an insulator, disposed between the current collection structure and the first wall, and configured to dielectrically insulate the current collection structure from the first wall; a second groove is made on a side of the insulator, the side being oriented toward the current collection structure; and the second groove is configured to communicate with the first through-hole and the second through-hole.

11. The battery cell according to claim 10, wherein the second groove extends to an outer peripheral surface of the insulator along a radial direction of the electrode assembly.

12. The battery cell according to claim 1, wherein the guide channel is a third groove, and the third groove is made on a side of the periphery portion, the side being oriented toward the electrode assembly; and the third groove communicates with the center hole.

13. The battery cell according to claim 12, wherein the third groove extends to an outer peripheral surface of the periphery portion along a radial direction of the electrode assembly.

14. The battery cell according to claim 1, wherein the shell further comprises a second wall, the second wall is disposed opposite to the first wall along an axial direction of the center hole, an injection port is made on the second wall at a position corresponding to the center hole, and the battery cell further comprises:

a sealer to seal up the injection port.

15. The battery cell according to claim 14, wherein a second tab is formed on the electrode assembly at an end oriented toward the second wall, the first tab and the second tab are of opposite polarities, and the second tab is electrically connected to the second wall.

16. The battery cell according to claim 14, wherein the shell comprises a housing and an end cap, the housing comprises a bottom wall and a sidewall, the sidewall encloses the bottom wall, one end of the sidewall is connected to the bottom wall, another end of the sidewall forms an opening, the end cap covers the opening, the first wall is the bottom wall, and the second wall is the end cap.

17. A battery, comprising the battery cell according to claim 1.

18. An electrical device, comprising the battery according to claim 17.

19. A method for manufacturing a battery cell, comprising:

providing a housing and an electrode terminal, wherein the housing comprises a bottom wall and a sidewall, the sidewall encloses the bottom wall, one end of the sidewall is connected to the bottom wall, another end of the sidewall forms an opening, and the electrode terminal is dielectrically mounted on the bottom wall;

providing an electrode assembly, wherein the electrode assembly comprises a center hole, a first tab is formed at one end of the electrode assembly, and a second tab is formed at another end of the electrode assembly;

providing a current collection structure, wherein the current collection structure comprises a center portion and a periphery portion, and a guide channel is disposed on the current collection structure;

providing an end cap, wherein an injection port is made on the end cap;

connecting the periphery portion to the first tab, making the center portion positionally correspond to the center hole, putting the electrode assembly into the housing, positioning the current collection structure between the bottom wall and the electrode assembly, and connecting the center portion to the electrode terminal;

covering the opening with the end cap, and connecting the end cap to the second tab so that the injection port positionally corresponds to the center hole; and injecting an electrolytic solution into the housing through the injection port so that the electrolytic solution enters the center hole and diffuses from the center portion to the periphery portion through the guide channel.

* * * * *